US011265926B2

(12) United States Patent
Ishii

(10) Patent No.: US 11,265,926 B2
(45) Date of Patent: *Mar. 1, 2022

(54) ACCESS NODE, A METHOD FOR AN ACCESS NODE, A WIRELESS TERMINAL AND A METHOD FOR A WIRELESS TERMINAL

(71) Applicants: SHARP KABUSHIKI KAISHA, Sakai (JP); FG Innovation Company Limited, Tuen Mun (HK)

(72) Inventor: Atsushi Ishii, Osaka (JP)

(73) Assignees: SHARP KABUSHIKI KAISHA, Sakai (JP); PG INNOVATION COMPANY LIMITED, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/083,246

(22) Filed: Oct. 28, 2020

(65) Prior Publication Data

US 2021/0045164 A1 Feb. 11, 2021

Related U.S. Application Data

(63) Continuation of application No. 16/597,325, filed on Oct. 9, 2019, now Pat. No. 10,841,958, which is a continuation of application No. 15/659,060, filed on Jul. 25, 2017, now Pat. No. 10,462,823.

(60) Provisional application No. 62/368,126, filed on Jul. 28, 2016.

(51) Int. Cl.
*H04W 74/08* (2009.01)
*H04W 48/10* (2009.01)
*H04W 48/12* (2009.01)
*H04W 72/04* (2009.01)
*H04W 88/02* (2009.01)

(52) U.S. Cl.
CPC ....... *H04W 74/0833* (2013.01); *H04W 48/10* (2013.01); *H04W 48/12* (2013.01); *H04W 72/0446* (2013.01); *H04W 88/02* (2013.01)

(58) Field of Classification Search
CPC ...... H04W 48/10; H04W 72/005; H04W 4/06
See application file for complete search history.

(56) References Cited

U.S. PATENT DOCUMENTS

| | | | |
|---|---|---|---|
| 8,379,567 B2 * | 2/2013 | Cho | H04W 48/12 370/326 |
| 8,837,404 B2 * | 9/2014 | Cha | H04L 27/2602 370/329 |
| 10,462,823 B2 * | 10/2019 | Ishii | H04W 48/10 |
| 10,841,958 B2 * | 11/2020 | Ishii | H04W 72/0446 |
| 2009/0221293 A1 * | 9/2009 | Petrovic | H04W 48/10 455/450 |

(Continued)

*Primary Examiner* — Dung Hong
(74) *Attorney, Agent, or Firm* — Finnegan, Henderson, Farabow, Garrett & Dunner LLP

(57) ABSTRACT

A method and apparatus is provided to use a value tag in conjunction with transmission and/or processing of system information in a wireless communication network, specifically in conjunction with second type system information or non-essential type system information. An access node may initiate broadcasting second type system information when the second type information content is updated, in order to avoid multiple on-demand delivery requests from wireless terminals. The access node may compress second type system information to be delivered by broadcast.

8 Claims, 31 Drawing Sheets

(56) References Cited

U.S. PATENT DOCUMENTS

| | | | |
|---|---|---|---|
| 2010/0227611 A1* | 9/2010 | Schmidt | H04W 52/0209 |
| | | | 455/434 |
| 2011/0002250 A1* | 1/2011 | Wang | H04W 76/40 |
| | | | 370/311 |
| 2015/0223148 A1* | 8/2015 | Shi | H04W 48/10 |
| | | | 370/312 |
| 2015/0334766 A1* | 11/2015 | Lee | H04W 56/002 |
| | | | 455/426.1 |
| 2016/0143017 A1* | 5/2016 | Yang | H04L 5/0053 |
| | | | 370/329 |
| 2016/0150506 A1* | 5/2016 | Tabet | H04W 48/12 |
| | | | 370/329 |
| 2016/0234759 A1* | 8/2016 | Kubota | H04W 48/12 |
| 2017/0251500 A1* | 8/2017 | Agiwal | H04W 74/0833 |
| 2017/0311290 A1* | 10/2017 | Adjakple | H04W 76/18 |
| 2018/0049024 A1* | 2/2018 | Schliwa-Bertling | H04W 8/30 |
| 2018/0132165 A1* | 5/2018 | Takahashi | H04W 72/12 |
| 2019/0029001 A1* | 1/2019 | Wang | H04W 4/06 |

* cited by examiner

ACCESS NODE, A METHOD FOR AN ACCESS NODE, A WIRELESS TERMINAL AND A METHOD FOR A WIRELESS TERMINAL

CROSS-REFERENCE TO RELATED APPLICATION(S)

The present application is a continuation application of U.S. patent application Ser. No. 16/597,325, filed on Oct. 9, 2019, which is a continuation application of U.S. patent application Ser. No. 15/659,060, filed on Jul. 25, 2017, and claims the priority and benefit of U.S. Provisional Patent Application Ser. No. 62/368,126, filed on Jul. 28, 2016. The contents of all above-identified applications are fully incorporated herein by reference for all purposes.

FIELD

The technology of the present application is related to wireless communications, and specifically to methods and apparatus for requesting, transmitting, and using system information (SI) in wireless communications.

BACKGROUND

In wireless communication systems, a radio access network generally comprises one or more access nodes (such as a base station) that communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels specific information which is required for mobile stations to access the network. In Long-Term Evolution (LTE) and LTE Advanced (LTE-A), such information is called "system information" ("SI"). Each access node, such as an evolved NodeB ("eNB"), broadcasts such system information to its coverage area via several System Information Blocks (SIBs) on downlink (DL) radio resources allocated to the access node.

A wireless terminal ("UE"), after entering a coverage area of an eNB, is required to obtain all the SIBs which are necessary to access the system. For UEs under coverage, the eNB periodically broadcasts all SIBs relevant for offered services, not just SIBs that are required for access to the system. Each type of SIBs is transmitted in a designated radio resource(s) with its own predetermined/configurable frequency.

This all-broadcast-based periodic delivery method (e.g., collective broadcast of all SIBs, not just those necessary for system access) is efficient under a condition where many UEs are almost always moving into the coverage area (such as a macro cell). However, this approach may result in wasting valuable radio resources in case of small cell deployment. Therefore, more efficient methods of SIB transmission are desired.

What is needed, therefore, and an example object of the present application is methods, apparatus, and techniques for more efficient transmission of SIBs.

SUMMARY

In one example of the present disclosure, an access node of a radio access network that communicates over a radio interface with a wireless terminal is provided. The access node comprises processor circuitry and transmitter circuitry. The processor circuitry is configured to generate a first type system information block (SIB) comprising information indicating whether one or more associated second type SIBs are provided by broadcast or on-demand, the first type SIB required for the wireless terminal to perform an initial access to the radio access network; and upon a change of one second type SIB of the one or more associated second type SIBs whose associated information previously indicated that the one second type SIB was provided on-demand, include in the first type SIB the associated information indicating that the one second type SIB is provided by broadcast. The transmitter circuitry is configured to transmit the first type SIB; and transmit a message that triggers the wireless terminal to receive the first type SIB.

In another example of the present disclosure, a method for an access node of a radio access network that communicates over a radio interface with a wireless terminal is provided. The method comprises generating a first type system information block (SIB) comprising information indicating whether one or more associated second type SIBs are provided by broadcast or on-demand, the first type SIB required for the wireless terminal to perform an initial access to the radio access network; upon a change of one second type SIB of the one or more associated second type SIBs whose associated information previously indicated that the one second type SIB was provided on-demand, including in the first type SIB the associated information indicating that the one second type SIB is provided by broadcast; transmitting the first type SIB; and transmitting a message that triggers the wireless terminal to receive the first type SIB.

In yet another example of the present disclosure, a wireless terminal of a radio access network that communicates over a radio interface with an access node of the radio access network is provided. The wireless terminal comprises receiver circuitry and processor circuitry. The receiver circuitry is configured to receive a message that triggers reception of a first type system information block (SIB); and receive, based on the reception of the message, the first type system information block (SIB) comprising information indicating whether one or more associated second type SIBs are provided by broadcast or on-demand, the first type SIB used to perform an initial access to the radio access network. The processor circuitry is configured to determine whether one second type SIB of the one or more associated second type SIBs has changed. The receiver circuitry is further configured to perform reception of the one second type SIB based on information associated with the one second type SIB, in a case that the one second type SIB has changed; and in a case that the one second type SIB was provided on-demand before the change, the associated information indicates that the one second type SIB is provided by broadcast.

In still another example of the present disclosure, a method for a wireless terminal of a radio access network that communicates over a radio interface with an access node of the radio access network is provided. The method comprises receiving a message that triggers reception of a first type system information block (SIB); receiving, based on the reception of the message, the first type SIB comprising information indicating whether one or more associated second type SIBs are provided by broadcast or on-demand, the first type SIB used to perform an initial access to the radio access network; and determining whether one second type SIB of the one or more associated second type SIBs has changed, wherein reception of the one second type SIB is performed based on information associated with the one second type SIB, in a case that the one second type SIB has changed; and wherein in a case that the one second type SIB was provided on-demand before the change, the associated information indicates that the one second type SIB is provided by broadcast.

BRIEF DESCRIPTION OF THE DRAWINGS

The foregoing and other objects, features, and advantages of the present application will be apparent from the following more specific description of preferred implementations as illustrated in the accompanying drawings in which reference characters refer to the same parts throughout the various views. The drawings are not necessarily to scale, emphasis instead being placed upon illustrating the principles of the technology disclosed herein.

DESCRIPTION

Figure 1:
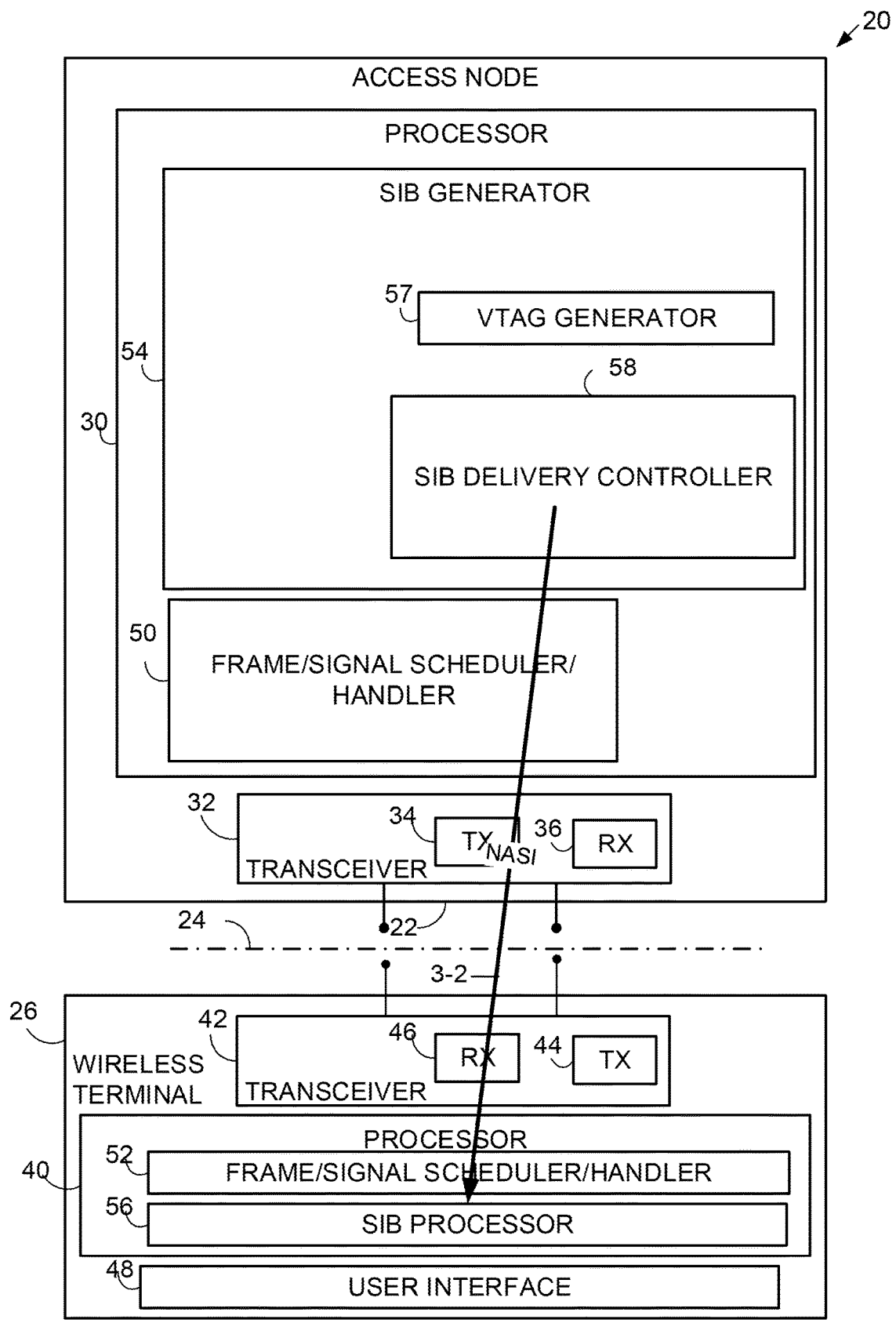
FIG. 1 is a schematic view illustrating an example communications system comprising an access node and a wireless terminal where the access node provides a value tag for system information (SI) and the access node communicates over air or radio interface (e.g., Uu interface) with the wireless terminal according to an example embodiment of the present application.

In the following description, for purposes of explanation and not limitation, specific details are set forth such as specific architectures, interfaces, techniques, etc. in order to provide a thorough understanding of the technology disclosed herein. However, it will be apparent to those skilled in the art that the technology disclosed herein may be practiced in other implementations that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and implementations of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or subsystem in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smartphones, personal digital assistants ("PDAs"), laptop computers, netbooks, e-readers, wireless modems, etc.

As used herein, the term "access node," "node," or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for the wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication systems.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMT-Advanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 1 is a schematic view illustrating an example communications system 20 comprising an access node 22 and a wireless terminal 26 where the access node 22 provides a value tag for system information (SI) and the access node 22 communicates over air or radio interface 24 (e.g., Uu interface) with the wireless terminal 26 according to an example embodiment of the present application. As mentioned above, the access node 22 may be any suitable node for communicating with the wireless terminal 26, such as a base station node, or eNodeB ("eNB"), for example. The access node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device.

For both the access node 22 and the wireless terminal 26, the respective transceiver circuitry 32 and 42 include antenna(s). The respective transmitter circuitry 34 and 44 may comprise, e.g., amplifier(s), modulation circuitry and other conventional transmission equipment. The respective receiver circuitry 36 and 46 may comprise, e.g., amplifiers, demodulation circuitry, and other conventional receiver equipment.

In general operation node, the access node 22 and wireless terminal 26 communicate with each other across radio interface 24 using predefined configurations of information. By way of non-limiting example, the access node 22 and wireless terminal 26 may communicate over the radio interface 24 using "frames" of information that may be configured to include various channels. In LTE, for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on the DL from the access node to the wireless terminal; an SC-FDMA symbol in an uplink (UL) frame from the wireless terminal to the access node). Each row of the grid represents a subcarrier. The frame and subframe structure serve only as an example of a technique of formatting of information that is to be transmitted over a radio or air interface. It should be understood that "frame" and "subframe" may be utilized interchangeably or may include or be realized by other units of information formatting, and as such may bear other terminology (such as blocks).

To cater to the transmission of information between the access node 22 and the wireless terminal 26 over the radio interface 24, the node processor 30 and terminal processor 40 of FIG. 1 are shown as comprising respective information handlers. For an example implementation in which the information is communicated via frames, the information handler for the access node 22 may be shown as node frame/signal scheduler/handler 50, while the information handler for wireless terminal 26 may be shown as terminal frame/signal scheduler/handler 52.

The node processor 30 of an access node 22 also includes a SI generator 54. The wireless terminal 26 uses the SI generated by the access node 22, and even in some example implementations specifically may request specific SI, in an on-demand fashion. To that end the terminal processor 40 of wireless terminal 26 is shown as comprising SIB processor 56.

The node processor 30, and SI generator 54, specifically, may generate a value tag that is associated with the SI. The value tag, also known as a version tag or "Vtag," may be configured to provide an indication of the version or vintage of system information with which the value tag is associated. In some example implementations, the value tag may take the form of a numeral or character, e.g., "1" for the first version, "2" for the second version, etc., or "A" for the first version, "B," for the second version, etc. Any other convention for differentiating between values or versions may instead be employed. To this end SI generator 54 may be shown as comprising value tag generator 57.

The value tag generator 57 may serve, e.g., to change the value tag when a parameter of the SI is changed. For example, the value tag generator 57 may increment a number of the value tag when a parameter of the second type SI is changed.

The SI generator 54 may also comprise SIB delivery controller 58, which controls the timing and content of delivery of SI, as well as timing and delivery of specific node-available system information ("NASI").

Figure 2:
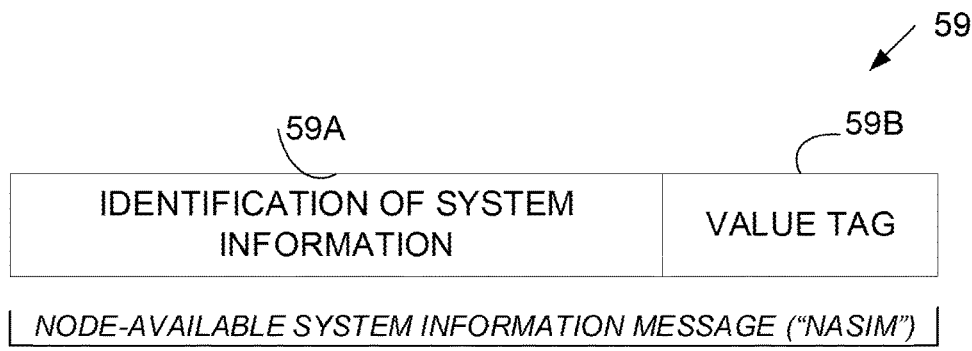
FIG. 2 is a diagrammatic view of a node-available system information message according to an example implementation of the present application.

FIG. 2 is a diagrammatic view of a node-available system information message according to an example implementation of the present application. FIG. 2 is a diagrammatic view of a NASI message according to an example implementation and mode. In an example implementation and mode illustrated in FIG. 2, the NASI may comprise a NASI message (NASIM) 59 that includes both an identification of the SI that is available from the access node 22, and the value tag associated with that available SI. To this end, the NASIM 59 of FIG. 2 illustrates an identification of system information field or information element 59A, and a value tag field or information element 59B.

Figure 3:
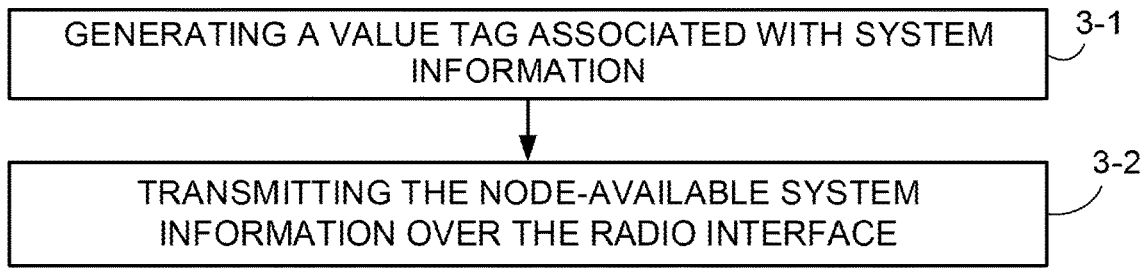
FIG. 3 is a flowchart illustrating basic acts or steps performed by the access node of FIG. 1.

FIG. 3 is a flowchart illustrating basic acts or steps performed by the access node 22 of FIG. 1. Act 3-1 comprises generating a value tag associated with SI that is available at the access node 22. As is understood in the art, the SI facilitates the use of communication services provided by the access node. Act 3-2 comprises transmitting the NASI over the radio interface 24. Such transmission may be by means of the NASIM 59. An arrow 3-2 in FIG. 1 corresponds to act 3-2 (and, in an example implementation, to the NASIM 59). As indicated above and with respect to FIG. 2, the NASIM comprises an identification of the SI and the value tag associated with the SI.

Figure 4:
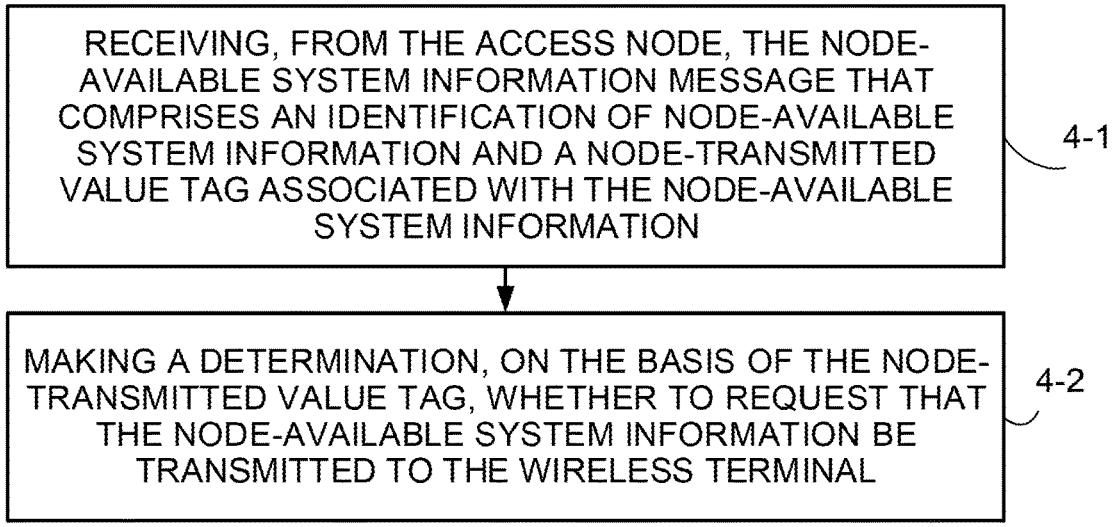
FIG. 4 is a flowchart illustrating basic acts or steps performed by the wireless terminal of FIG. 1.

FIG. 4 is a flowchart illustrating basic acts or steps performed by the wireless terminal 26 of FIG. 1. Act 4-1 comprises receiving, from the access node 22, the NASIM (3-2) that comprises an identification of NASI and a node-transmitted value tag associated with the NASI. Act 4-2 comprises making a determination, on the basis of the node-transmitted value tag, whether to request that the NASI be transmitted to the wireless terminal. If the determination of act 4-2 indicates that the available SI as advertised in the NASIM (3-2) should be obtained (e.g., because that available SI has a more recent value tag), then the wireless terminal 26 sends a request message to the access node 22 to obtain the advertised system information.

Figure 5:
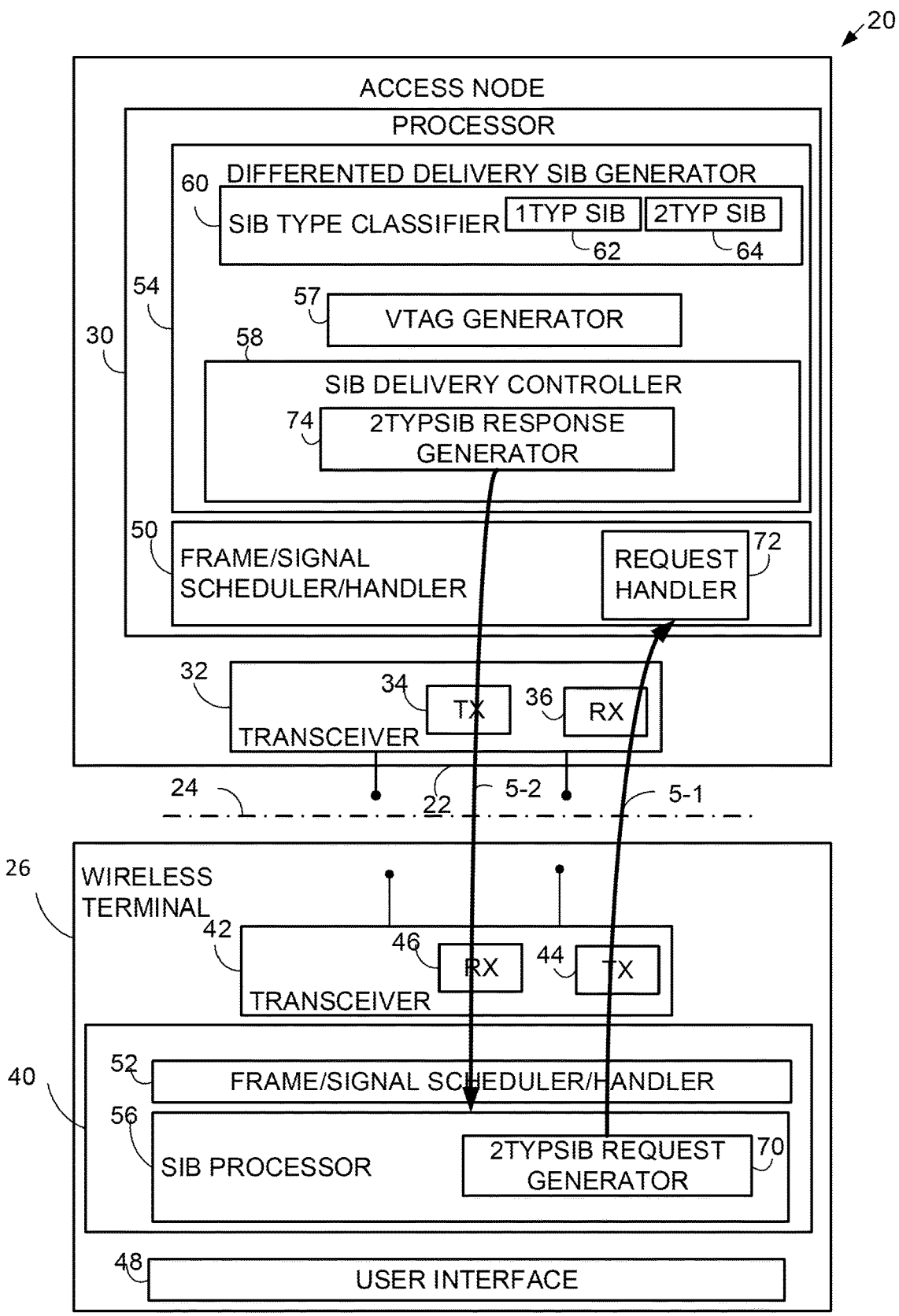
FIG. 5 is a schematic view illustrating an example communications system comprising an access node and a wireless and a wireless terminal where the access node provides a value tag for SI along with differentiated delivery of SI according to an example implementation of the present application.

FIG. 5 is a schematic view illustrating an example communications system comprising an access node 22 and a wireless terminal 26 where the access node 22 provides a value tag for SI along with differentiated delivery of SI according to an example implementation of the present application. The SI may be classified into plural categories or types, and delivery of each category or type of SI may be separately triggered and thus separately delivered across the radio interface 24 to one or more wireless terminals. Accordingly, the SI generator of an access node 22 may be also known as differentiated delivery SIB generator 54.

In view of the fact that, in specific example implementations and modes, the SI may be classified into plural categories or types, the SI generator 54 is depicted in FIG. 5 as comprising SIB type classifier 60 that defines the plural categories or types of SI, and may further define an association between the plural types and respective SIBs. For sake of example two representative categories or types of SI may be shown as defined by the SIB type classifier 60 in FIG. 5: a first type of SI (1TYP SIB) and a second type of SI (2TYP SIB). Definitions and procedures for handling for the first type of SI (1TYP SIB) and the second type of SI (2TYP SIB) may be selectively configured and maintained, and are accordingly reflected by 1TYPSIB controller 62 and 2TYPSIB controller 64, respectively.

In an example implementation and mode, the first type of SI (1TYP SIB) may be SIB "essential system information," which means SI which is essential to or minimally required by the wireless terminal 26 for initial access to the radio access network and to the radio interface 24 specifically. Essential system information may also be referred to as "minimum SI." On the other hand, in the same example implementation and mode, the second type of SI (2TYP SIB) may be non-essential SI. "Non-Essential" SI is defined as all other types of information, and thus excludes the minimal information required for initial access. Non-Essential SI may also be referred to as "other SI". As such, the second type of SI (2TYP SIB) may facilitate the utilization of specific features or services provided by or through the access node 22. Thus, the first type SI may comprise information that is periodically broadcasted by the transmitter and that is required for initial access to the radio access network, but the second type SI may be not required for initial access to the radio access network.

In some example implementations and modes described herein, the access node 22 may separately deliver the different types of SI, e.g., delivers the second type of SI (2TYP SIB) separately from the first type of SI (1TYP SIB). For example, the node processor 30 may schedule periodic transmissions by the transmitter of first type SI over the radio interface; and thereafter or separately from the periodic transmissions of the first type SI, schedule transmission by the transmitter of second type SI over the radio interface. Accordingly, in example implementations and modes, the SIB delivery controller 58, among other things, may implement the "differentiated" delivery of the second type of SI (2TYP SIB) apart from the first type of SI (1TYP SIB). As explained herein, the transmission of second type SI may be either by unicast or broadcast.

FIG. 5 further illustrates that the wireless terminal 26 may, after obtaining initial access to the communications system 20 (e.g., as a result of receiving the first type of SI (1TYP SIB)), recognize or appreciate that the wireless terminal 26 may need the second type of SI (2TYP SIB). Thus, the wireless terminal 26 may make a special request for the second type of SI (2TYP SIB). FIG. 5 implementation and mode is thus an example of the access node 22 providing second type SI "on demand." Such request or demand for the second type of SI (2TYP SIB) may arise, for example, when the wireless terminal 26 seeks to utilize a specific service provided by the communications system 20 or functionality of the wireless terminal 26 which, although not required for access, may enhance the operation of the wireless terminal 26. Accordingly, FIG. 5 illustrates the SIB processor 56 of the wireless terminal 26 as comprising 2TYPSIB request generator 70, which may generate a 2TYPSIB request depicted by arrow 5-1.

FIG. 5 further illustrates node frame/signal scheduler/handler 50 as comprising 2TYPSIB request handler 72, and further illustrates the SIB delivery controller 58 as comprising 2TYPSIB response generator 74. In the implementation and mode of FIG. 5, the 2TYPSIB response generator 74 may generate a response message 5-2 that includes one or more requested SIBs, e.g., includes at least one block of the second type SI.

Thus, in the implementation and mode of FIG. 5, the node processor 30 schedules periodic transmissions by the transmitter of first type SI over the radio interface. Thereafter or separately from the periodic transmissions of the first type SI, and upon request by the wireless terminal 26, the node processor 30 may schedule transmission by the transmitter of second type SI over the radio interface. The request by the wireless terminal 26 may arise after the wireless terminal 26 receives the NASIM59, which advises of the value tag for the NASI. Thus, in the implementation and mode of FIG. 5, the value tag may be associated with the second type SI.

Figure 6:
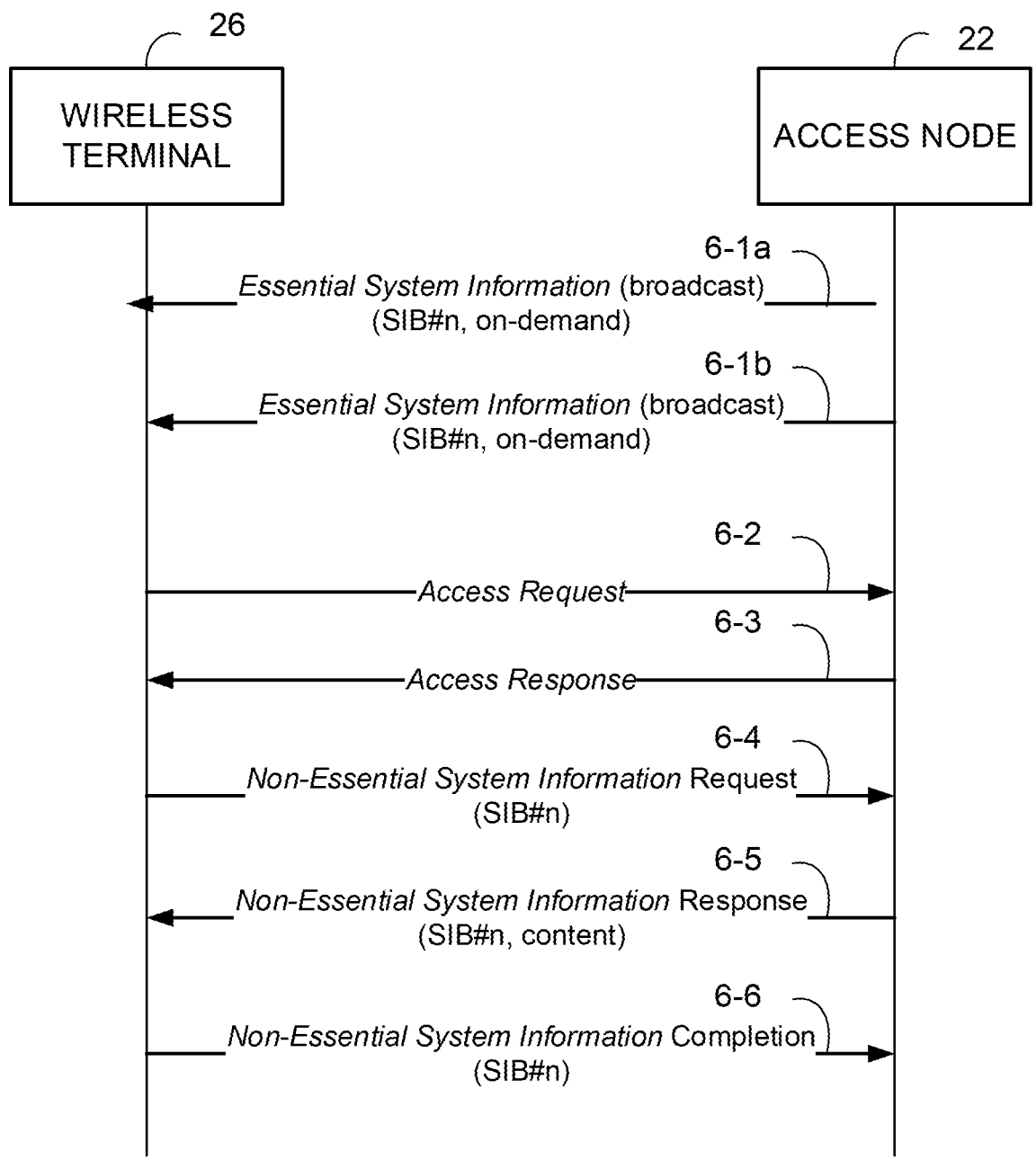
FIG. 6 is a diagrammatic view illustrating an example message flow according to the communications system of FIG. 5.

FIG. 6 is a diagrammatic view illustrating an example message flow according to the communications system of FIG. 5. In FIG. 6 message flow, when a wireless terminal enters the coverage area of the access node 22, the wireless terminal may first receive from the access node 22 the Essential System Information (i.e., the first type of SI (1TYP SIB)), and, specifically, may receive Essential System Information periodically broadcasted in messages containing the essential SIB(s) as information elements. The periodic broadcast by the access node 22 of the Essential System Information is shown by messages 6-1*a* and 6-1*b* of FIG. 6. It is understood (in FIG. 6 and other similar drawings) that there may be more than two such broadcast messages.

Figure 7:
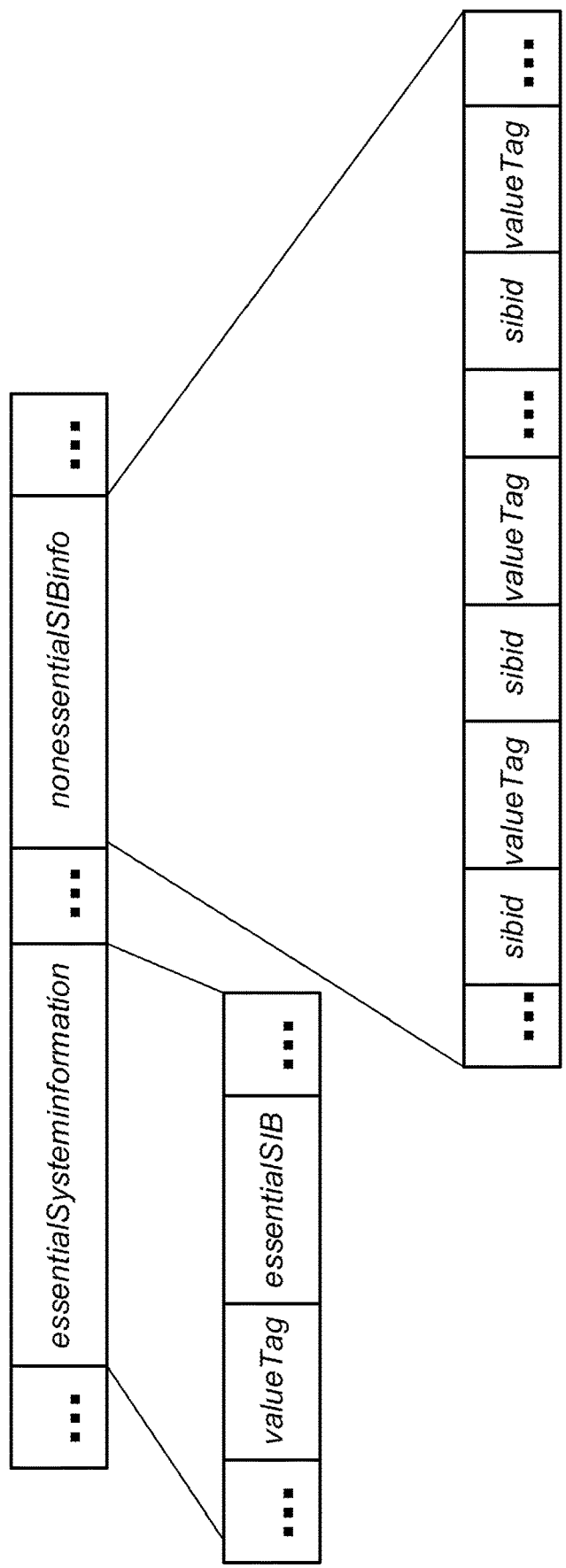
FIG. 7 is a diagrammatic view illustrating an example format of an Essential System Information message according to the communications system of FIG. 5.

FIG. 7 is a diagrammatic view illustrating an example format of an Essential System Information message according to the communications system of FIG. 5. An example Essential System Information message for the implementation and mode of FIG. 5 are shown in FIG. 7 and hereinafter described.

As shown in FIG. 7, the Essential System Information message may comprise a nonEssentialSIBInfo information element that includes the identification of the Non-Essential SIBs. If the nonEssentialSIBInfo information element is not present in the message, or if the information element is present but the list is empty, the wireless terminal assumes that all the SIBs from this access node 22 are essential SIBs.

Upon receiving the Essential System Information, i.e., the first type of SI (1TYP SIB), the wireless terminal 26 initiates the system access procedure by sending an Access Request message 6-2, which is acknowledged by the access node 22 with an Access Response message 6-3. Following the system access procedure (comprised of the acts just described), the wireless terminal 26 sends a Non-Essential System Information Request message 6-4 to the access node 22. The Non-Essential System Information Request message 6-4 may be generated by 2TYP SIB request generator 70 of FIG. 5, and may include an indication of one or more pieces of the second type of SI (2TYP SIB), e.g., one or more SIB numbers (SIB #), that the wireless terminal 26 desires. The wireless terminal 26 was made aware of the existence of the second type of SI by the nonessentialSIBinfo information element. Such an indication of desired SIB # may be expressed in an information element of the Non-Essential System Information Request message 6-4. The Non-Essential System Information Request message 6-4 may be sent using uplink dedicated resources (e.g., radio resources of a frame).

In response to the Non-Essential System Information Request message 6-4, the access node 22 may send Non-Essential System Information Response message 6-5 using the downlink dedicated resources. The Non-Essential System Information Response message 6-5 may comprise the requested SIB #n (e.g., the SIB #n requested by the wireless terminal 26). The requested SIB #n may be included in an information element of the Non-Essential System Information Response message 6-5. Afterwards, when the wireless terminal 26 has successfully obtained the requested SIB #n from the Non-Essential System Information Response message 3-5, the wireless terminal 26 may send to the access node 22 a Non-Essential System Information Completion message 6-6, at which point the access node 22 may release the uplink/downlink dedicated resources. Alternatively, the access node 22 may release the uplink/downlink dedicated resources after sending Non-Essential System Information Response message 6-5.

An example Essential System Information message for the implementation and mode of FIG. 5 is shown in FIG. 7. In the implementation and mode of FIG. 5 and FIG. 6, one or more and preferably a non-essential (e.g., second type) SIB may be associated with a value tag that uniquely identifies a specific version of the content for that SIB. When broadcasting Essential System Information message, the access node 22 of FIG. 5 may include the value tags for the latest contents of non-essential SIBs. Further, the value tag may change when any configuration parameters in the corresponding SIB gets updated. In one example implementation, the value tag may be incremented by one upon the SIB update. Other types of modifications, e.g., decrementing, version prefixes, or suffixes, may be employed.

FIG. 7 illustrates an example format of the Essential System Information message, where the nonEssentialSIBInfo information element, each sibId is paired with valueTag, the value tag of the corresponding non-essential SIB. Thus, in an example implementation, the NASIM 59 may be an Essential System Information message, as shown in FIG. 7. FIG. 7 specifically illustrates that the Essential System Information message may also, when functioning as the NASIM 59, include an information element specifying what non-essential SIBs are available at this access node 22 upon request. FIG. 7 illustrates the essentialSystemInformation information element carrying at least one essential SIB, and a nonEssentialSIBInfo information element may include a list of identifiers (sibIds) for such available non-essential SIBs. In addition, for one or more and preferably each non-essential SIBs, a value tag may be provided in the nonEssentialSIBInfo information element.

FIG. 7 also illustrates that Essential SIB(s) may also be associated with at least one value tag, which is different from the ones for non-essential SIBs, and may be conveyed as a part of the Essential System Information message.

In a specific example implementations and modes, the value tag of a non-essential SIB may be valid within one access node 22, e.g., valid within a coverage area or cell served by the access node 22. But in other example implementations and modes, the value tag may have collective applicability, e.g., be capable of expressing a value for more than one cell, for more than one piece of SI (e.g., more than one SIB), etc. In other words, the applicable "base" of the value tag, the information to which the value tag pertains, may be selectively defined in terms of various factors such as area, number of SIBs, and so forth.

Figure 8:
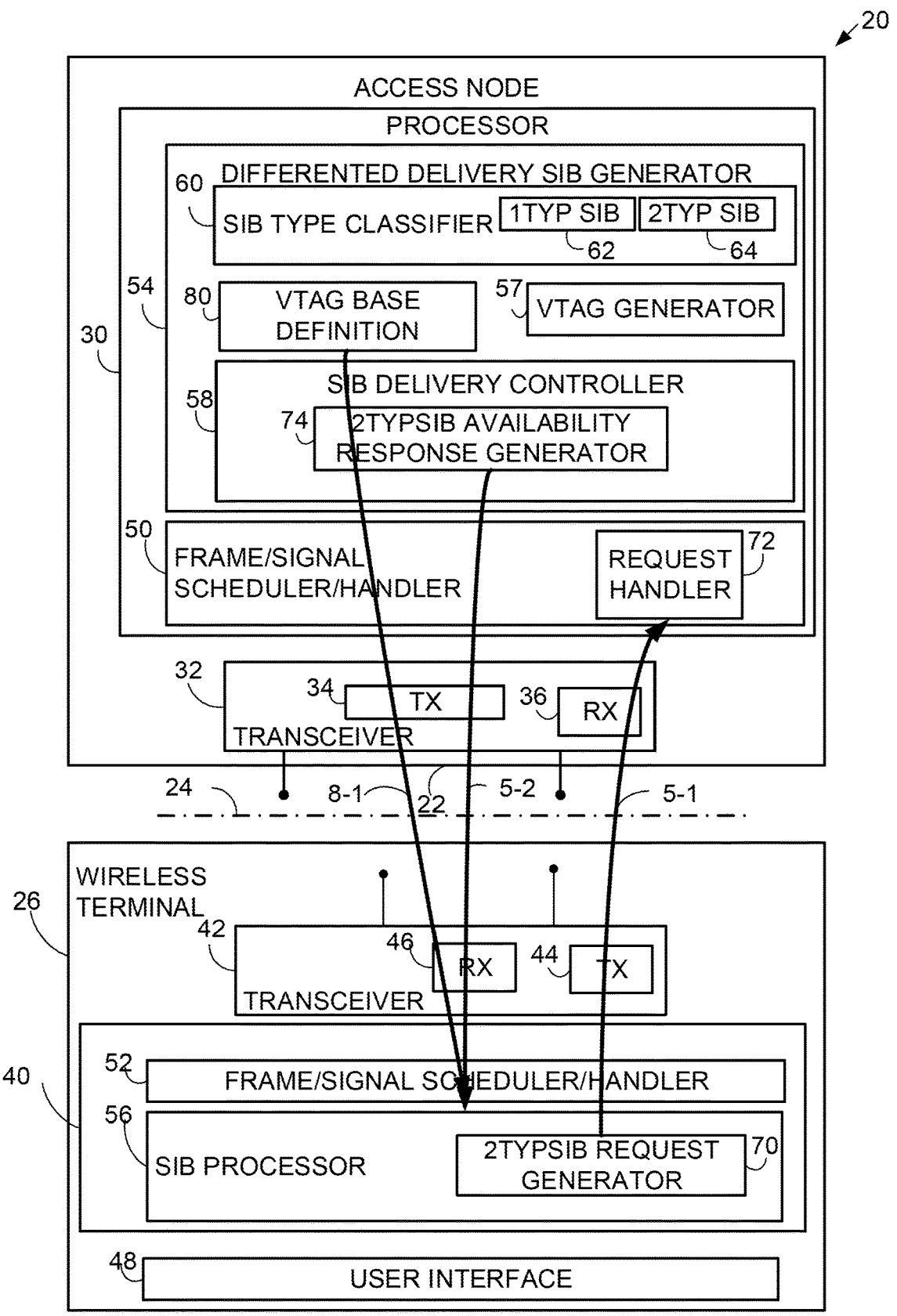
FIG. 8 is a schematic view illustrating an example communications system comprising an access node and a wireless terminal where the access node provides a value tag for SI along with a definition of a base of second type SI to which the value tag applies according to an example implementation of the present application.

FIG. 8 is a schematic view illustrating an example communications system comprising an access node 22 and a wireless terminal 26 where the access node provides a value tag for SI along with a definition of a base of second type SI to which the value tag applies according to an example implementation of the present application. In the above regard, in an example implementation and mode shown in FIG. 8, the SI generator 54 may include not only the value tag generator 57, but also logic, memory, or controller for a value tag base definition 80. In an example implementation, for example, the value tag base definition 80 may specify that the value tag is valid in at least one geographical area comprising a plurality of access nodes. Thus, the node processor 30 may generate the value tag to be valid in a geographical area served by the access node and a group of at least one other access node. In such example implementation, the value tag base definition 80, or value tag "validity area," may be separately signaled from the access nodes to the wireless terminals in their respective coverage areas. That is, the node processor 30 may generate a signal (such as signal 8-1 of FIG. 8) to define the group of other access nodes.

Thus, in the implementation and mode of FIG. 8, a wireless terminal may consider the non-essential SI, a second type SIB, to be "current" if (1) it was received in the validity area of the access node upon which the wireless terminal is camping; (2) the value tag of the received non-essential SIB is the same as the one that the camped access node is currently advertising in the Essential System Information message, and (3) it was received within a predetermined or network-configured (e.g., configured by eNB) time period from the present time.

Figure 9:
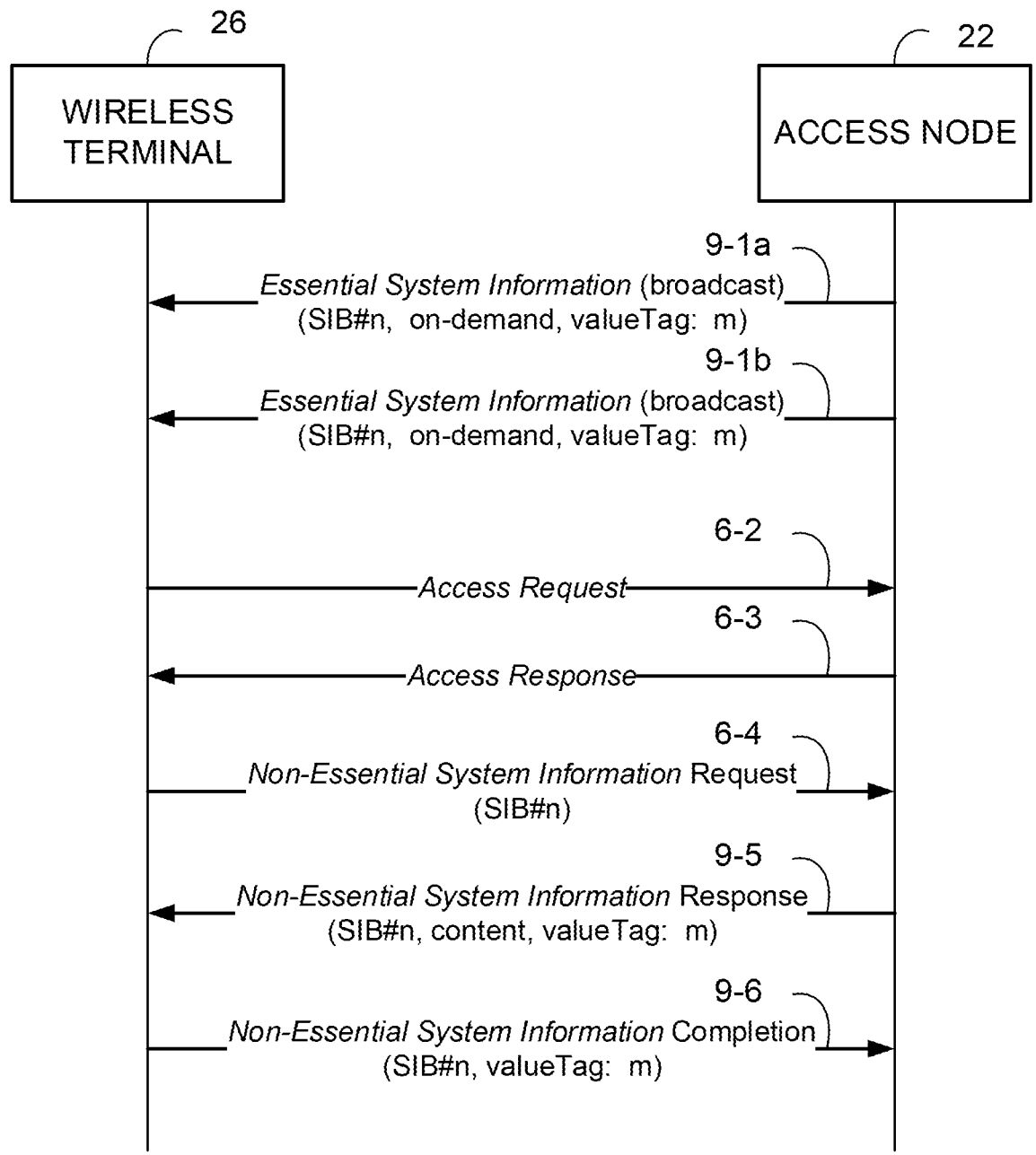
FIG. 9 is a diagrammatic view illustrating an example message flow according to the communications system of FIG. 8.

FIG. 9 is a diagrammatic view illustrating an example message flow according to the communications system of FIG. 8. In the example implementation and mode of FIG. 8, it is assumed that the wireless terminal 26 may make an on-demand request for second type SI. Accordingly, in FIG. 9, the Essential System Information messages 9-1a and 9-1b may be indicated as being "SIB #n: on-demand." Further, as explained above, the Essential System Information messages 9-1a and 9-1b may include the value tag ("valueTag: m"). After receiving the Essential System Information, the wireless terminal 26 may perform an access procedure comprising Access Request message 6-2 and Access Response message 6-3.

In FIG. 9 scenario the wireless terminal 26 may not need to take further actions respecting the second type of SI if the wireless terminal 26 has previously received the SIB #n and the value tag for the previously-received SIB #n as stored at the wireless terminal 26 is current (e.g., is "m"). Otherwise, if the wireless terminal 26 has a value tag for the SIB #n that is older than "m," the wireless terminal 26 may proceed to request the SIB #n transmission using the Non-Essential System Information Request message 6-4, in a manner similar to that described in a previous implementation.

Thus, in the example implementation and mode of FIG. 8 and FIG. 9, the Non-Essential System Information Response message 9-5 and/or Non-Essential System Information Completion message 9-6 may contain the value tag with the current value (valueTag=m).

Figure 10:
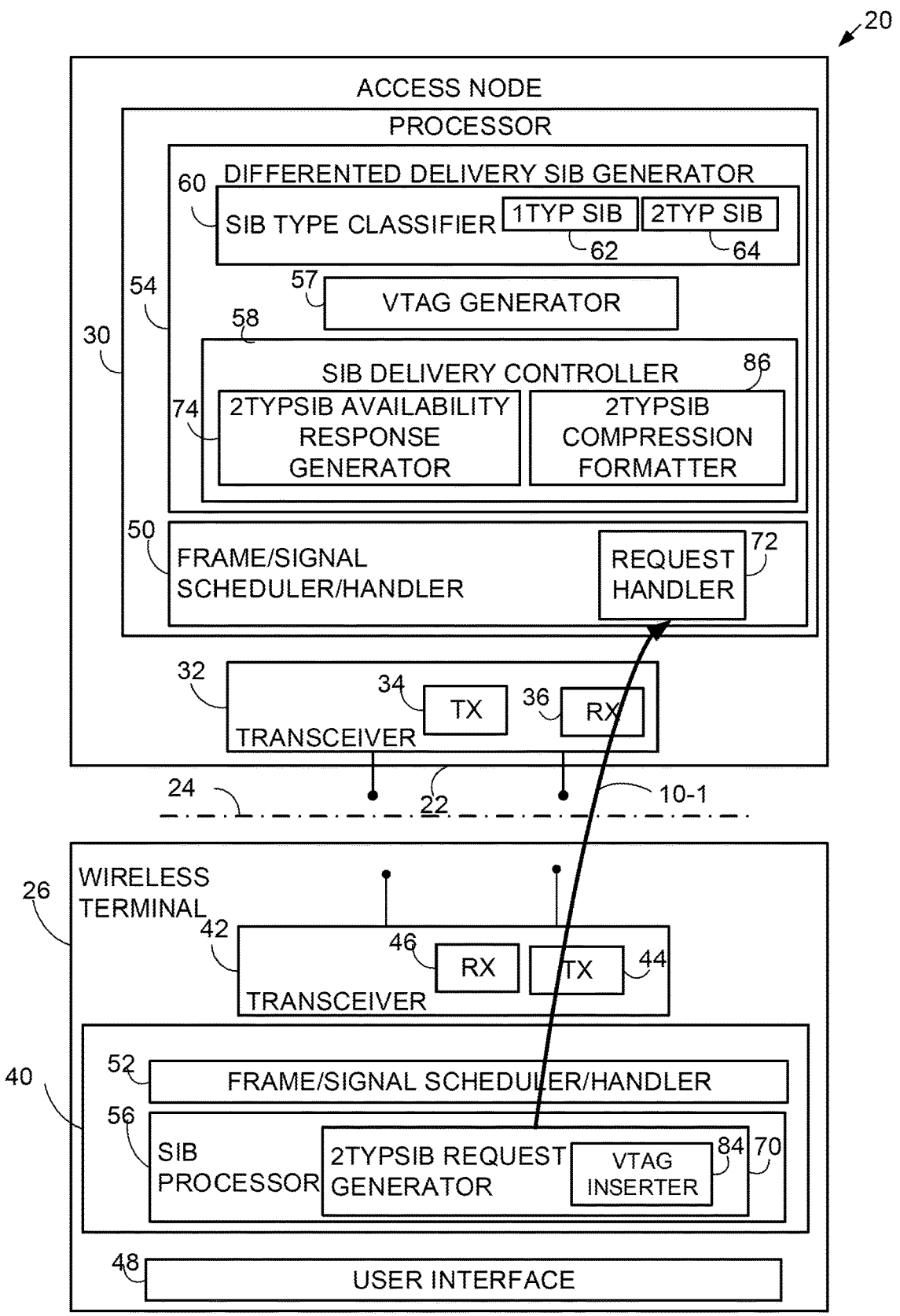
FIG. 10 is a schematic view illustrating an example communications system comprising an access node and a wireless terminal where the wireless terminal provides a stored value tag for stored second type SI when requesting second type SI from the access node according to an example implementation of the present application.

FIG. 10 is a schematic view illustrating an example communications system comprising an access node 22 and a wireless terminal 26 where the wireless terminal 26 provides a stored value tag for stored second type SI when requesting second type SI from the access node according to an example implementation of the present application. In an example implementation and mode shown in FIG. 10, the wireless terminal 26 may optionally include in request message 10-1 (requesting the second type SI) the stored value tags of the requested second type SI. This may occur in a situation in which the wireless terminal 26 already has stored values for the second type SI and already has stored value tags for the stored second type SI, but the wireless terminal 26 does not know if the stored second type SI is or is not truly current in terms of network usage for each of the stored SIBs of the second type SI. The wireless terminal 26 may request second type SI for plural different second type SIBs, and the plural second type SIBs may each have different value tags.

In the example implementation and mode of FIG. 10, the wireless terminal 26 may comprise value tag inserter functionality 84, which includes in the request message 10-1 the stored value tag for the second type SI already stored at the wireless terminal 26. Moreover, as understood below, the access node 22 and SIB delivery controller 58, specifically, may comprise a compression formatter for the second type SI, e.g., 2TYPSIB compression formatter 86.

Thus, the example implementation and mode of FIG. 10 are similar to the implementation and mode of FIG. 8, but the wireless terminal 26 may optionally include in the Non-Essential System Information Request message 10-1 the value tags of the requested non-essential SIBs, where the wireless terminal 26 obtained those value tags when it previously received the corresponding non-essential SIB s.

Figure 11:
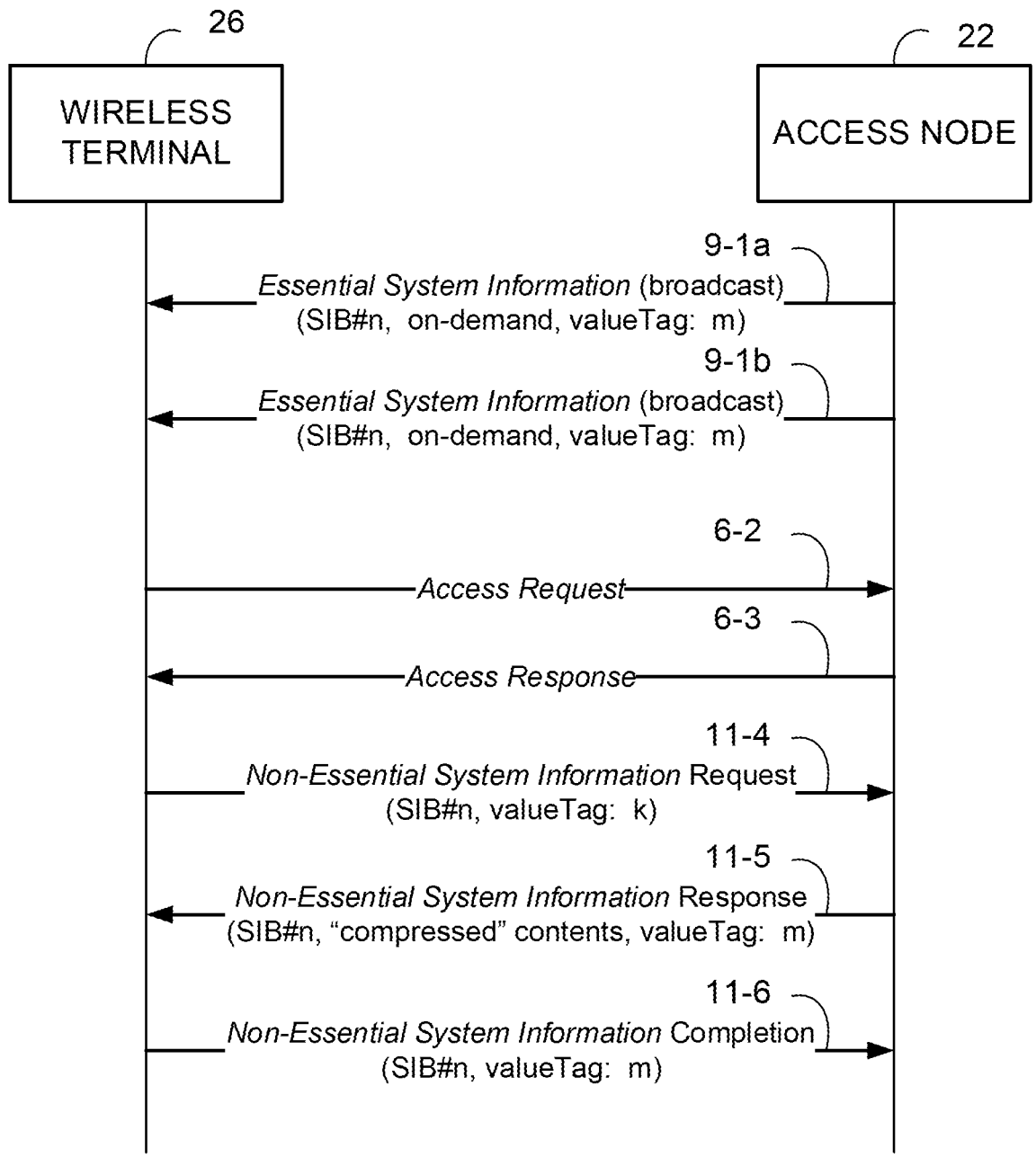
FIG. 11 is a diagrammatic view illustrating an example message flow according to the communications system of FIG. 10.

An exemplary scenario of the implementation and mode of FIG. 10 is illustrated in the message flow of FIG. 11. FIG. 11 is a diagrammatic view illustrating an example message flow according to the communications system of FIG. 10. FIG. 11 illustrates, by the Non-Essential System Information Request message 11-4 (which corresponds to message 10-1 of FIG. 10), that valueTag=k for its requested SIB #n. Based on this received value tag, the access node 22 and the 2TYPSIB compression formatter 86, specifically, may compose "compressed" content of the SIB #n to be delivered via Non-Essential System Information Response message 11-5. The wireless terminal 26 may send to the access node 22 a Non-Essential System Information Completion message 11-6.

In one example implementation of FIG. 10 and FIG. 11, the compressed content may comprise the differences between the current SIB #n (valueTag=m) and the previously transmitted (valueTag=k). For example, if SIB #n consists of parameters p1 to p10 and if only p3 and p7 have been updated (if the access node 22 has newer values only for parameters P3 and p7 of second type SI), the compressed content of the Non-Essential System Information Response message 11-5 may include only p3 and p7 with updated values.

Thus, the example implementation and mode of FIG. 10 and FIG. 11 is specifically but not exclusively applicable to situations in which the second type SI comprises plural parameters and the receiver is configured to receive a wireless terminal-reported value tag in the request message. Basic example acts performed by the access node 22 in conjunction with the example implementation and mode of FIG. 10 and FIG. 11 are shown in FIG. 12.

Figure 12:
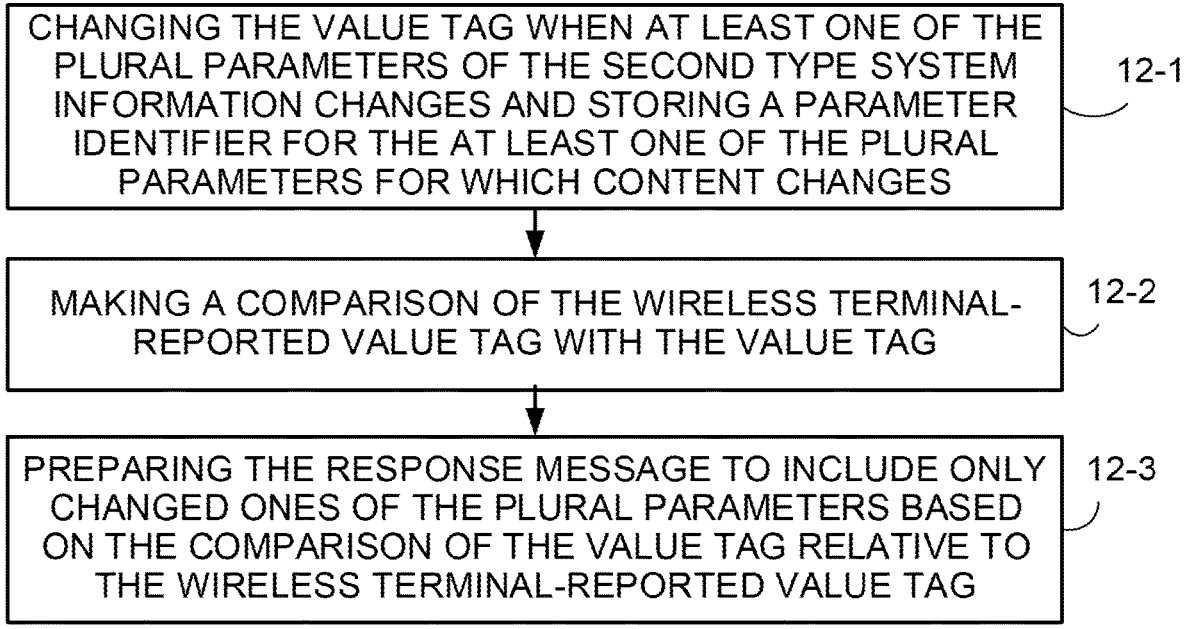
FIG. 12 is a flowchart illustrating basic acts or steps performed by the access node of FIG. 10 in implementing specific acts of FIG. 11.

FIG. 12 is a flowchart illustrating basic acts or steps performed by the access node of FIG. 10 in implementing specific acts of FIG. 11. Act 12-1 comprises the node processor 30 (and SI generator 54 specifically) changing the value tag when at least one of the plural parameters of the second type SI changes and storing a parameter identifier for the at least one of the plural parameters for which content changes. Act 12-2 comprises making a comparison of the wireless terminal-reported value tag (e.g., the value tag reported in the request message 10-1) with the value tag (the changed value tag). Act 12-3 comprises preparing the response message (e.g., the Non-Essential System Information Response message 11-5) to include only changed ones of the plural parameters based on the comparison of the value tag relative to the wireless terminal-reported value tag.

In some cases, the access node 22 may have an option to send the non-compressed versions of the requested non-essential SIBs even if the Non-Essential System Information Request message contains value tags. One example of such cases may be where the access node 22 no longer stores the contents of the previously transmitted non-essential SIBs indicated by the received value tags.

Figure 13:
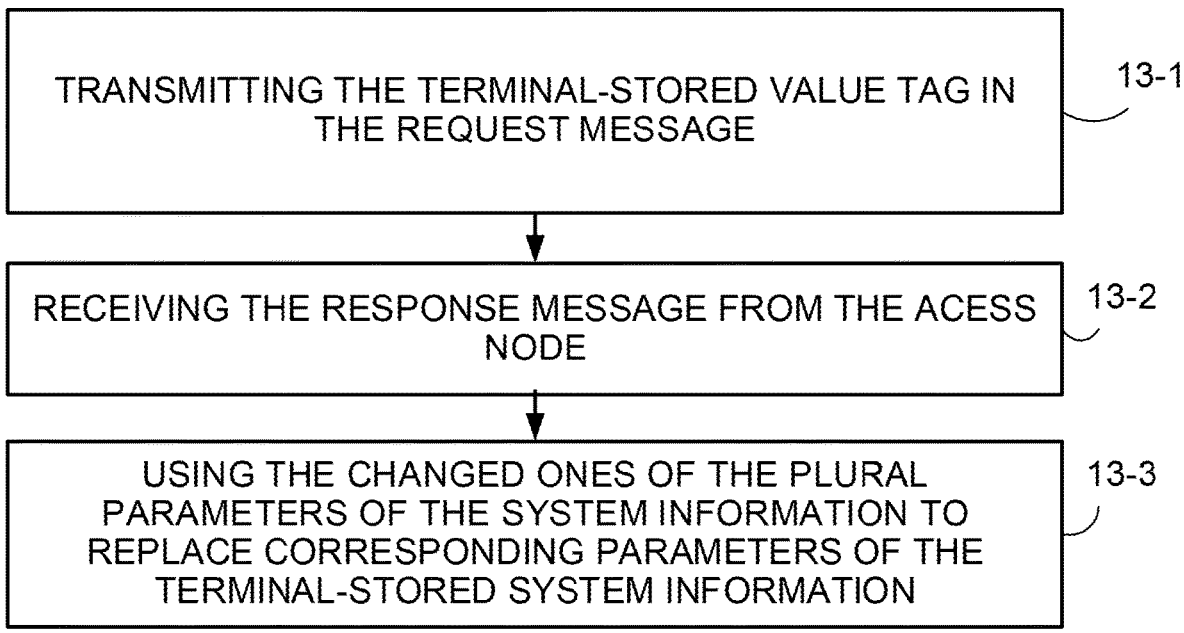
FIG. 13 is a flowchart illustrating basic acts or steps performed by the wireless terminal of FIG. 10 in implementing specific acts of FIG. 11.

Basic example acts performed by the wireless terminal 26 in conjunction with the example implementation and mode of FIG. 10 and FIG. 11 are shown in FIG. 13. FIG. 13 is a flowchart illustrating basic acts or steps performed by the wireless terminal of FIG. 10 in implementing specific acts of FIG. 11. Act 13-1 comprises the wireless terminal 26 transmitting the terminal-stored value tag in the request message (e.g., in message 11-4). Act 13-2 comprises the wireless terminal 26 receiving the response message (e.g., message 11-5) from the access node. As mentioned above, the response message includes changed ones of the plural parameters based on a comparison at the access node of the node-reported value tag relative to the terminal-stored value tag. Act 13-3 comprises the wireless terminal 26 using the changed ones of the plural parameters of the SI to replace corresponding parameters of the terminal-stored SI.

In the above regard, the wireless terminal 26 may construct the entire SIB #n using the received compressed content, and the content of SIB #n saved in its memory. In the example described above, the wireless terminal 26 may overwrite saved p3 and p7 with the ones received in the compressed content. The wireless terminal 26 may further update the saved value tag for SIB #n to valueTag=m.

In typical deployments, the content of SI may be stable and even if it has some updates, those updates may be generally minor. By the approach described in the example implementation of FIG. 10 and FIG. 11, it is possible to reduce the data size of the Non-Essential System Information Response message.

Figure 14:
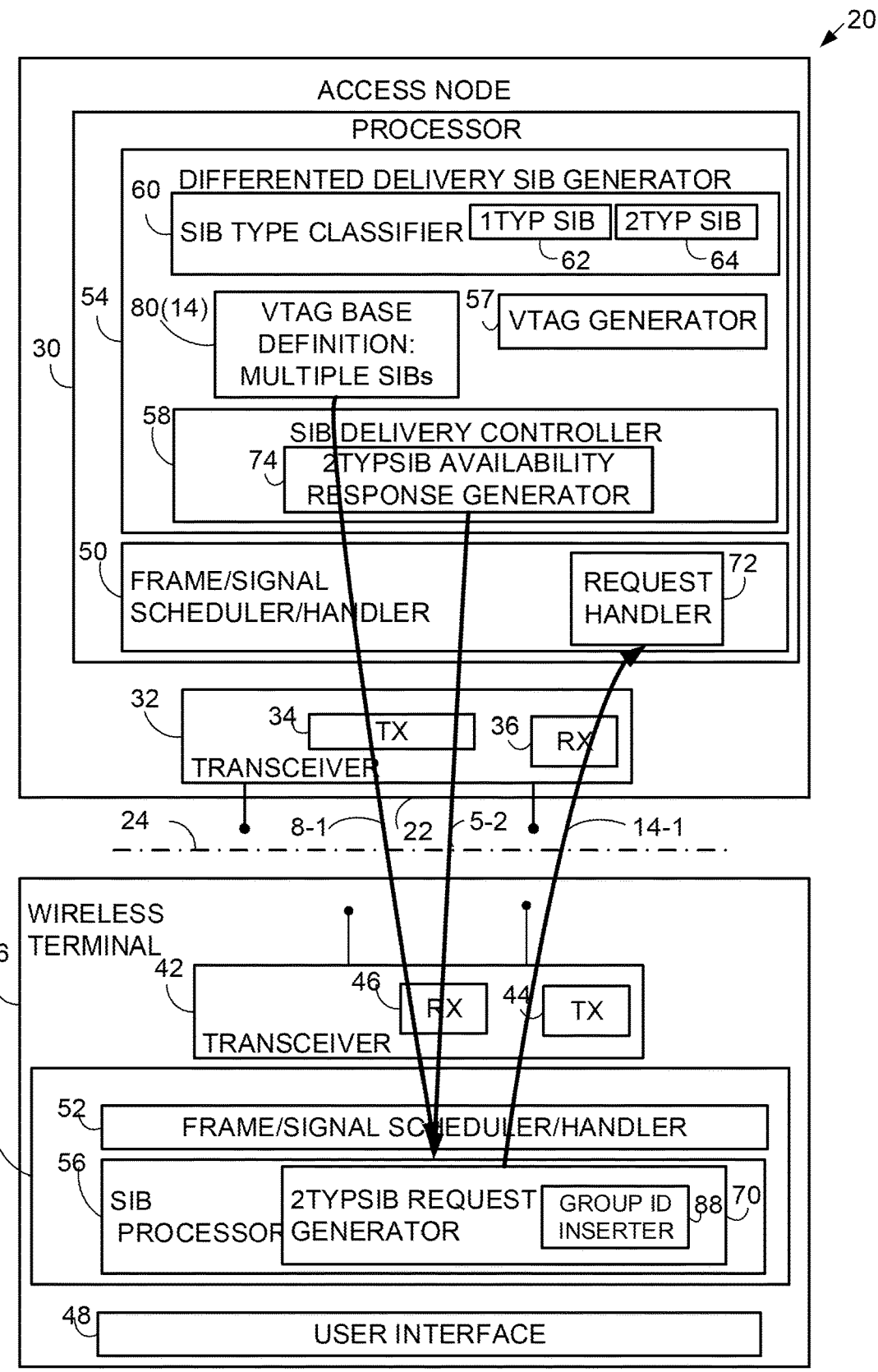
FIG. 14 is a schematic view illustrating an example communications system comprising an access node and a wireless terminal where the access node provides a value tag which is associated with a group of plural SIBs according to an example implementation of the present application.

FIG. 14 is a schematic view illustrating an example communications system comprising an access node 22 and a wireless terminal 26 where the access node 22 provides a value tag which is associated with a group of plural SIBs according to an example implementation of the present application. The example implementation and mode of FIG. 14 is similar to the implementation and mode of FIG. 8, but differs in that a value tag may represent a value or version for an aggregation of multiple non-essential SIBs, e.g., a group of second type SIBs. Specifically, the value tag base definition 80(14) of the implementation and mode of FIG. 14 may define multiple sibIds associated with one valueTag to thereby form a non-essential or second type SIB "group." Thus, in the example implementation and mode of FIG. 14, the node processor 30 may generate the value tag to be associated with a group of plural second type SIBs. The 2TYP SIB request generator 70 of the wireless terminal 26 of FIG. 14 may include a group identifier inserter ("group ID inserter 88") that includes, in a request message 14-1, an identification of the group of second type SIBs which are the subject of a second type SI request. The request message 14-1 also may include a value tag associated with the group.

Figure 15:
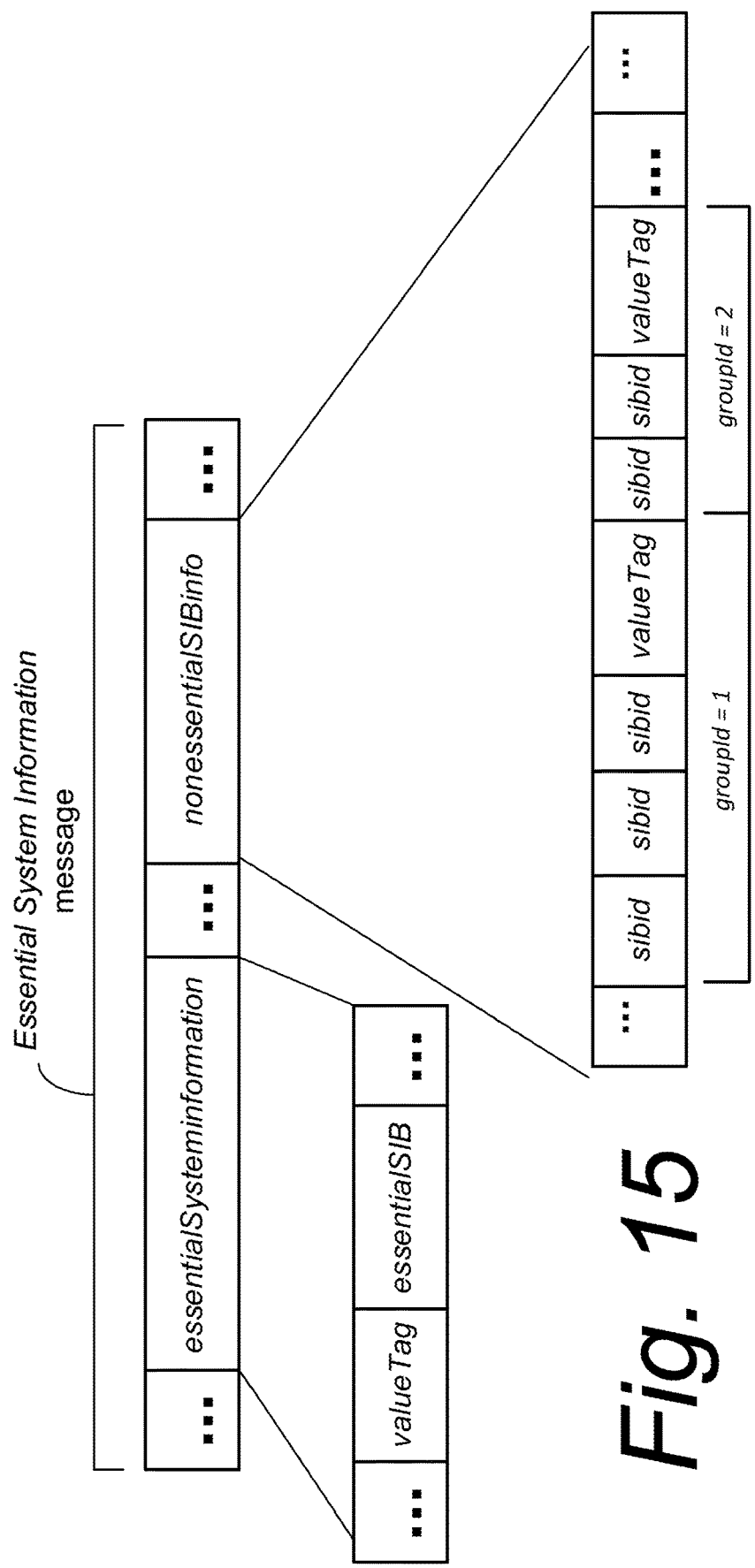
FIG. 15 is a diagrammatic view illustrating an example format of an Essential System Information message according to the system of FIG. 14 where multiple sibIds associated with one valueTag form a non-essential SIB group.

FIG. 15 is a diagrammatic view illustrating an example format of the Essential System Information message according to the system of FIG. 14 where multiple sibIds associated with one valueTag form a non-essential SIB group. The valueTag in each non-essential SIB group of this message may be updated when the content of at least one non-essential SIB belonging to this group changes. In one configuration, each non-essential SIB group may be associated with groupId, an index of the group in the order of occurrence in the nonEssentialSIBInfo.

Figure 16:
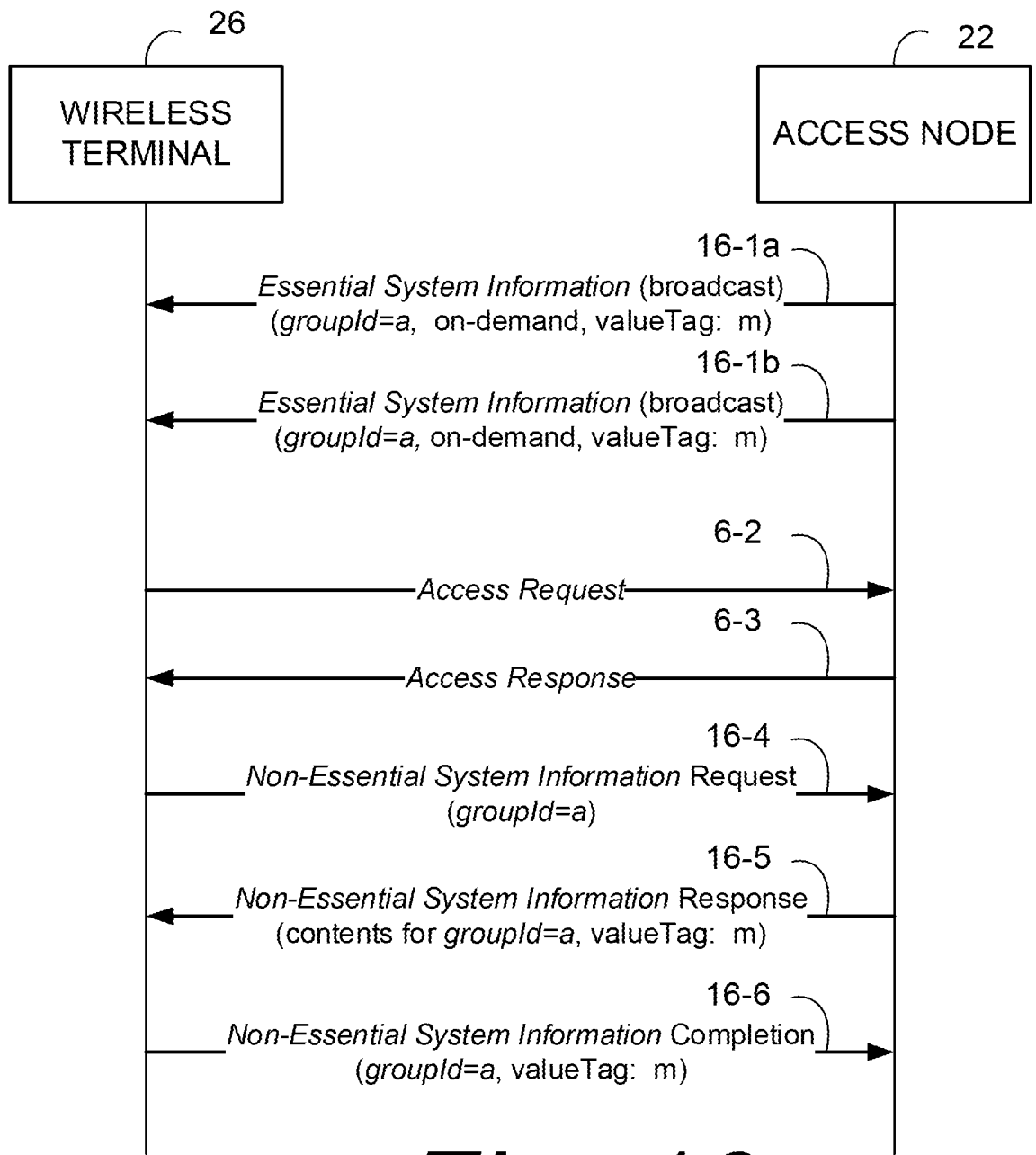
FIG. 16 is a diagrammatic view illustrating an example message flow according to the communications system of FIG. 14.

FIG. 16 is a diagrammatic view illustrating an example message flow according to the communications system of FIG. 14. FIG. 16 particular illustrates Essential System Information messages 16-1a and 16-1b as advertising a non-essential SIB group with groupId=a and valueTag=m. The wireless terminal 26, when requesting the contents of the non-essential SIBs belonging to the group, may send to the access node 22 the Non-Essential System Information Request message 16-4 containing groupId=a. In response, the access node 22 may send Non-Essential System Information Response message 16-5 including the contents of all the non-essential SIBs of the group defined by groupId=a. The wireless terminal 26 may send to the access node 22 a Non-Essential System Information Completion message 16-6.

As explained above, the example implementation and mode of FIG. 14 and FIG. 16 may involve, e.g., generating the value tag to be associated with a group of plural second type SIBs. Basic example acts performed by the access node 22 in conjunction with the example implementation and mode of FIG. 14 and FIG. 16 are shown in FIG. 17.

Figure 17:
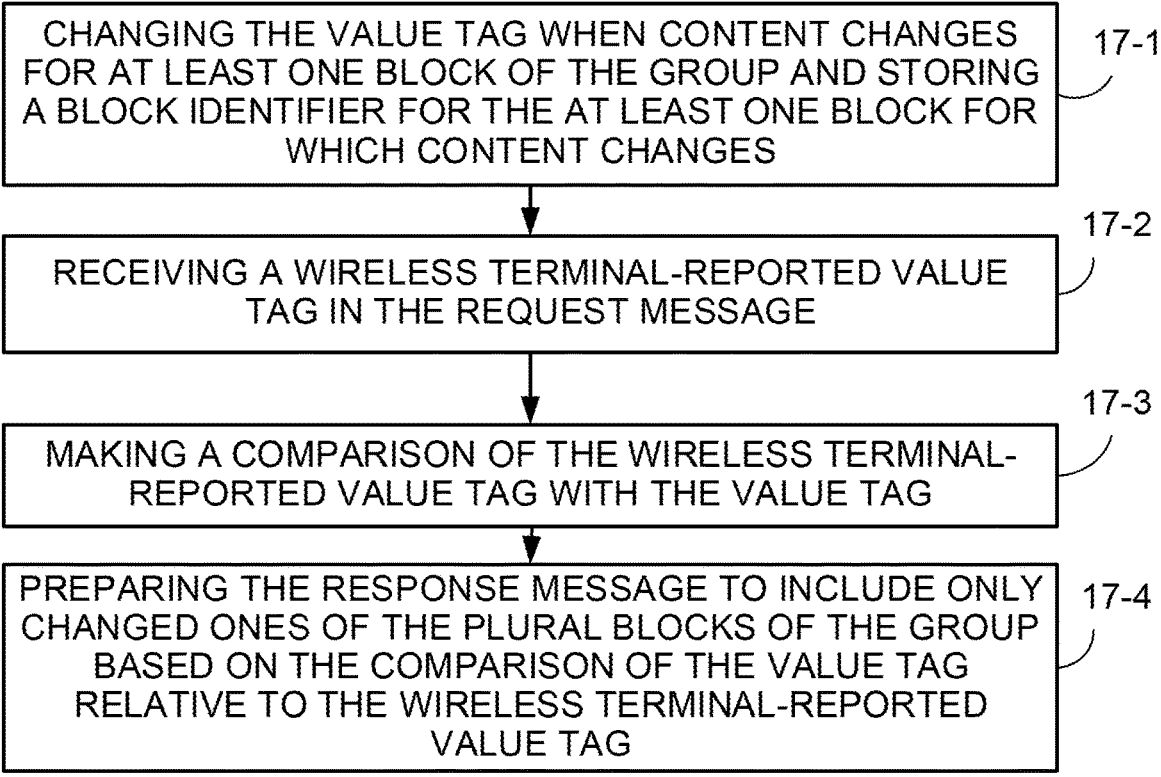
FIG. 17 is a flowchart illustrating basic acts or steps performed by the access node of FIG. 14 in implementing specific acts of FIG. 16.

FIG. 17 is a flowchart illustrating basic acts or steps performed by the access node of FIG. 14 in implementing specific acts of FIG. 16. Act 17-1 comprises changing the value tag when content changes for at least one block of the group and storing a block identifier for the at least one block for which content changes. Act 17-2 comprises receiving a wireless terminal-reported value tag in the request message. Act 17-3 comprises making a comparison of the wireless terminal-reported value tag with the value tag. Act 17-4 comprises preparing the response message to include only changed ones of the plural blocks of the group based on the comparison of the value tag relative to the wireless terminal-reported value tag.

Figure 18:
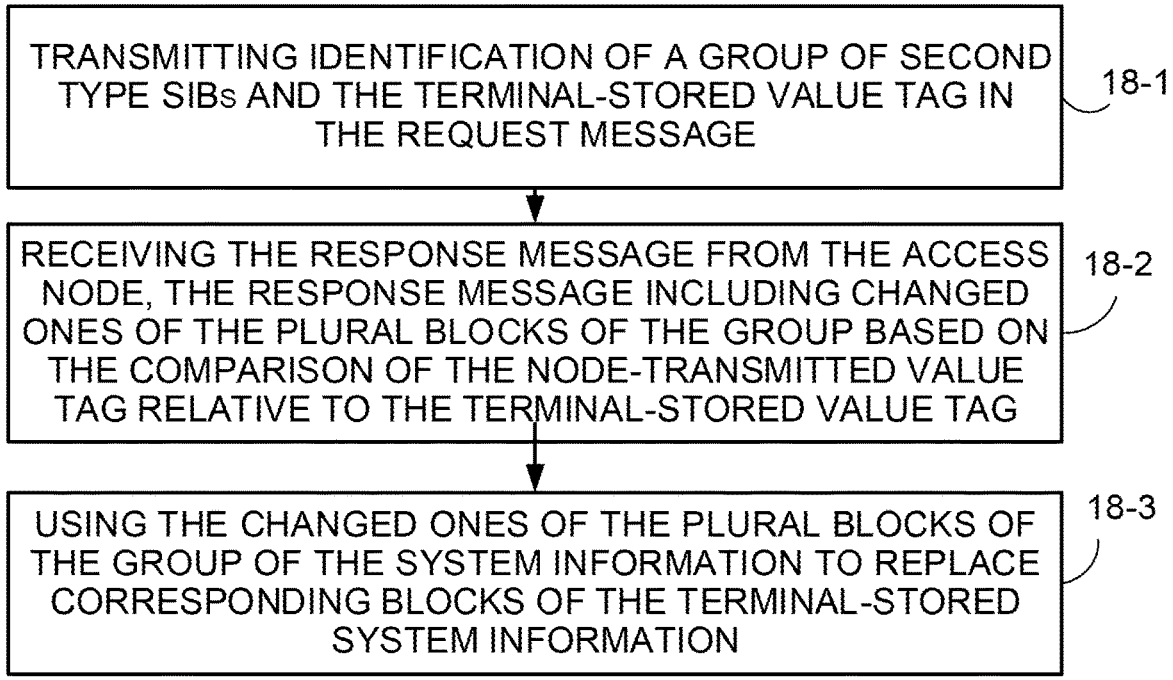
FIG. 18 is a flowchart illustrating basic acts or steps performed by the wireless terminal of FIG. 14 in implementing specific acts of FIG. 16.

Basic example acts performed by the wireless terminal 26 in conjunction with the example implementation and mode of FIG. 14 and FIG. 16 are shown in FIG. 18. FIG. 18 is a flowchart illustrating basic acts or steps performed by the wireless terminal of FIG. 14 in implementing specific acts of FIG. 16. Act 18-1 comprises transmitting an identification of a group of second type SIBs and the terminal-stored value tag in the request message (e.g., in message 16-4 of FIG. 16). Act 18-2 comprises receiving the response message (e.g., message 16-5 of FIG. 16) from the access node, the response message including changed ones of the plural blocks of the group based on the comparison of the node-transmitted value tag relative to the terminal-stored value tag. Act 18-3 comprises using the changed ones of the plural blocks of the group of the system information to replace corresponding blocks of the terminal-stored SI.

Figure 19:
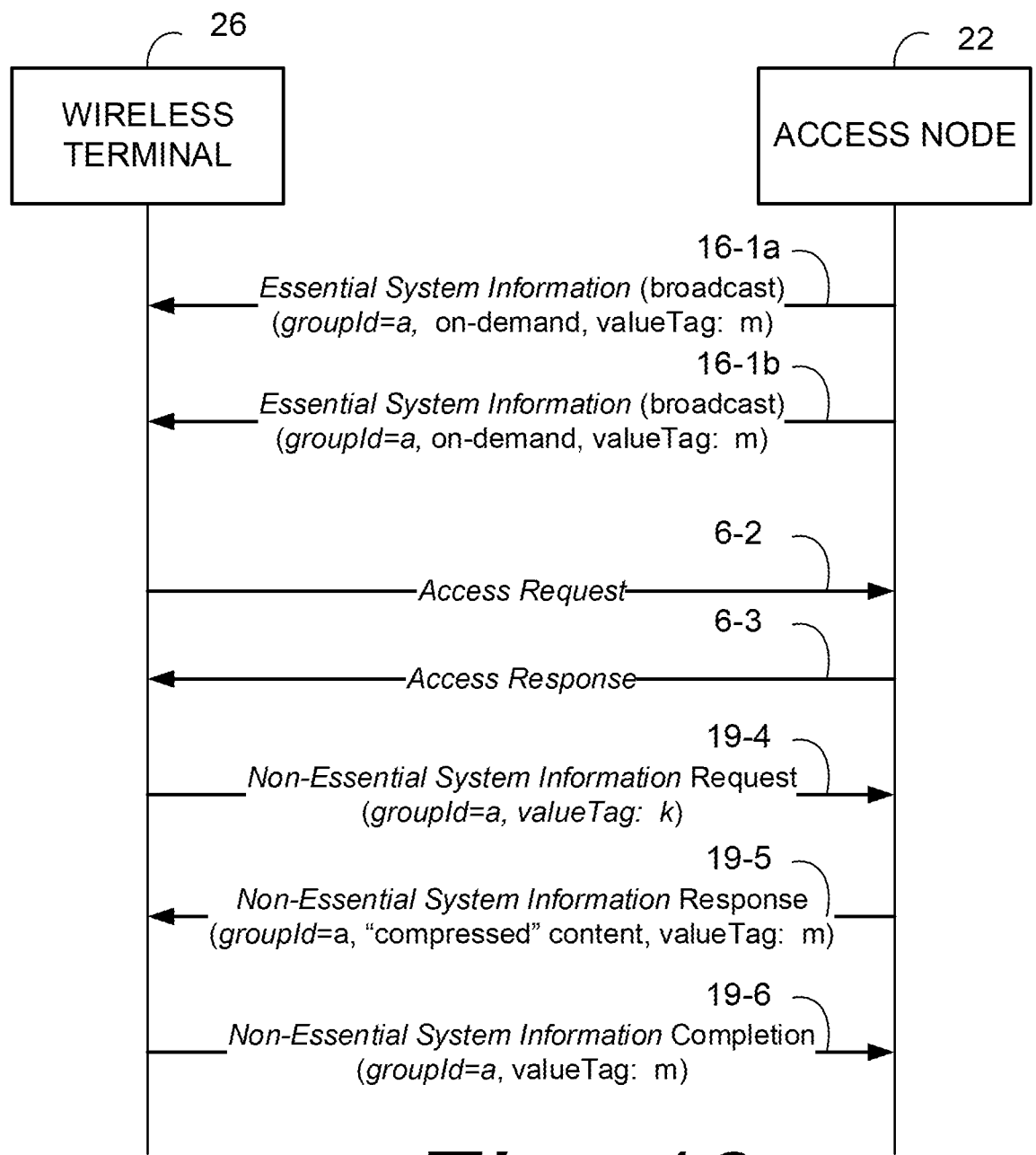
FIG. 19 is a diagrammatic view illustrating an example message flow that combines features according to the implementation of FIG. 10 and the implementation of FIG. 14.

Another example implementation and mode, having a message flow represented by FIG. 19, is based on the combination of the content compression method disclosed in the implementation of FIG. 10 and the concept of non-essential SIB group described in the implementation of FIG. 14. FIG. 19 is a diagrammatic view illustrating an example message flow that combines features according to the implementation of FIG. 10 and the implementation of FIG. 14. In the message flow of FIG. 19, the wireless terminal 26 may send Non-Essential System Information Request message 19-4 with groupId=a, since the value tag that UE saves for this non-essential SIB group is not current. The Non-Essential System Information Response message 19-5 that the access node 22 sends in response may contain compressed content of the non-essential SIB group. In one implementation, the compressed content may comprise the differences between the current non-essential SIBs (valueTag=m) and the previously broadcasted non-essential SIBs(valueTag=k) under the same non-essential SIB group. The wireless terminal 26 may send to the access node 22 a Non-Essential System Information Completion message 19-6.

Figure 20:
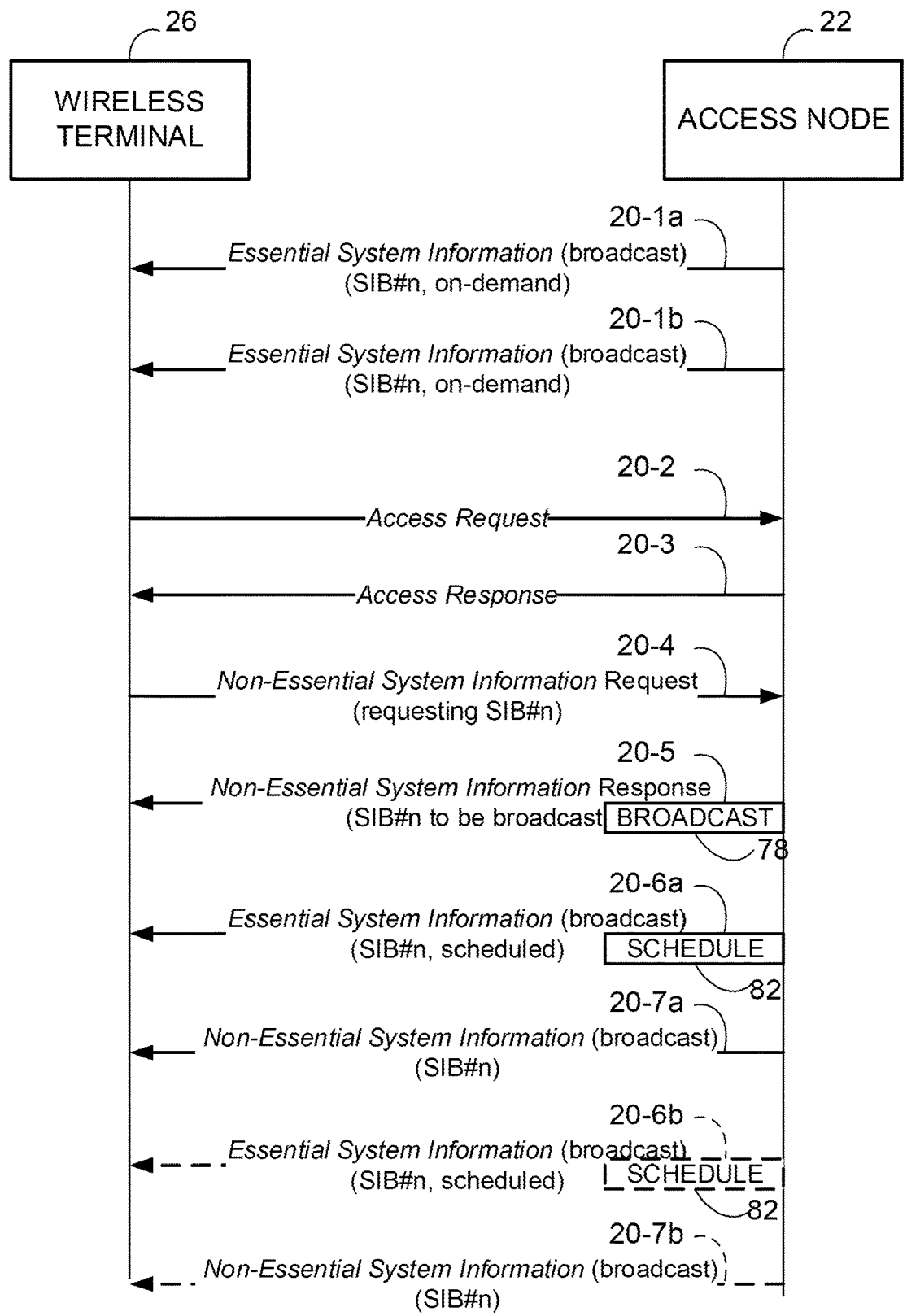
FIG. 20 is a diagrammatic view illustrating an example message flow according to an example implementation of the present application.

FIG. 20 is a diagrammatic view illustrating an example message flow according to an example implementation of the present application. The initial messages (e.g., the Essential System Information messages 20-1a and 20-1b, the Access Request 20-2 and the Access Response 20-3) of FIG. 20 are similar to those of some preceding implementations and modes, but in FIG. 20 the Non-Essential System Information Response message 20-5 may include an information element 78 indicating that the requested SIB #n will be broadcasted instead of being unicasted. The access node 22, at a subsequent cycle of an Essential System Information message transmission (e.g., at the Essential System Information message 20-6a), may start including at least one information element (such as information element 82) for the scheduling information of SIB #n transmissions. Based on this scheduling information, the access node 22 may broadcast the Non-Essential System Information message 20-7a containing the requested SIB #n. As indicated by the messages depicted in broken lines in FIG. 20, the access node 22 may repeat these two steps multiple times for reliable delivery (e.g., the Essential System Information message 20-6b and the Non-Essential System Information message 20-7b). By receiving at least one of these repetitions, the wireless terminal 26 should successfully obtain the SIB #n. The number of repetitions may be determined by the access node 22, and information indicating the number may be broadcasted together with the essential SI. Alternatively, the number of repetitions may be determined by the wireless terminal 26 and may be notified to the access node 22 through the Non-Essential System Information Request message 20-4.

In some implementations of the example implementation and mode of FIG. 20 the access node 22 may include a value tag(s) in messages, such as in the Essential System Information message(s) 20-6 of FIG. 20. Likewise, in some example implementations the broadcasted Non-Essential System Information message(s) 20-7 may comprise a value tag that represents the version of the non-essential SIB(s) delivered by the Non-Essential System Information message(s).

Figure 21:
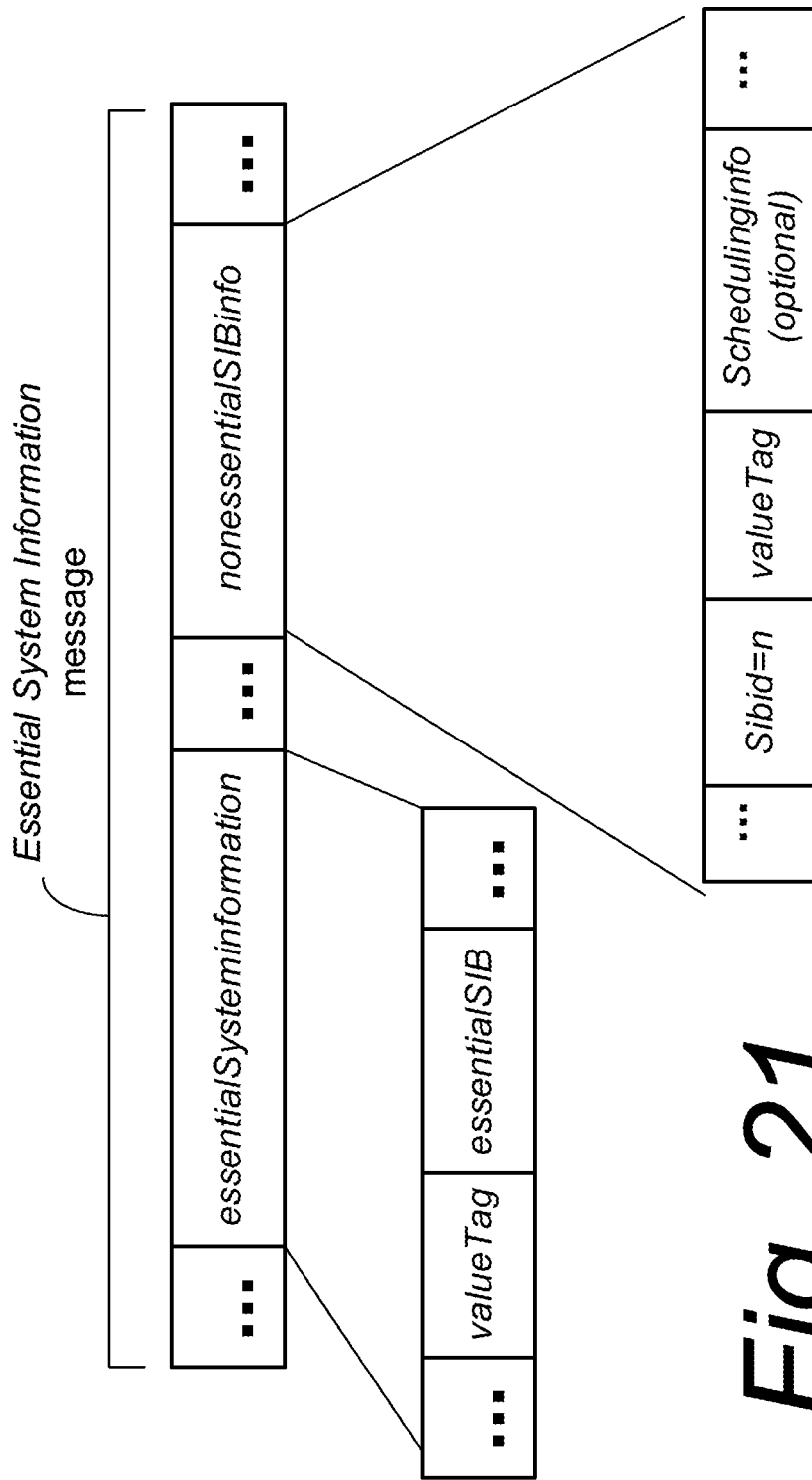
FIG. 21 is a diagrammatic view illustrating an example format of an Essential System Information message according to the system of FIG. 20.

FIG. 21 is a diagrammatic view illustrating an example format of an Essential System Information message according to the system of FIG. 20. In FIG. 21, the SchedulingInfo optional information element may be used for indicating the broadcast schedules for Non-Essential System Information message with the updated SIB #n content.

A benefit of the implementation and mode of FIG. 20 is that the requested SIB #n may also be received by other wireless terminals entering the same coverage area. Such wireless terminals may receive the Essential System Information message 20-6a and know that the SIB #n is scheduled to be transmitted. As a result, the number of transmissions for Non-Essential System Information Request message 20-4 may be reduced. An additional benefit is that the transmissions of messages 20-2 and 20-3 may also be reduced.

Figure 22:
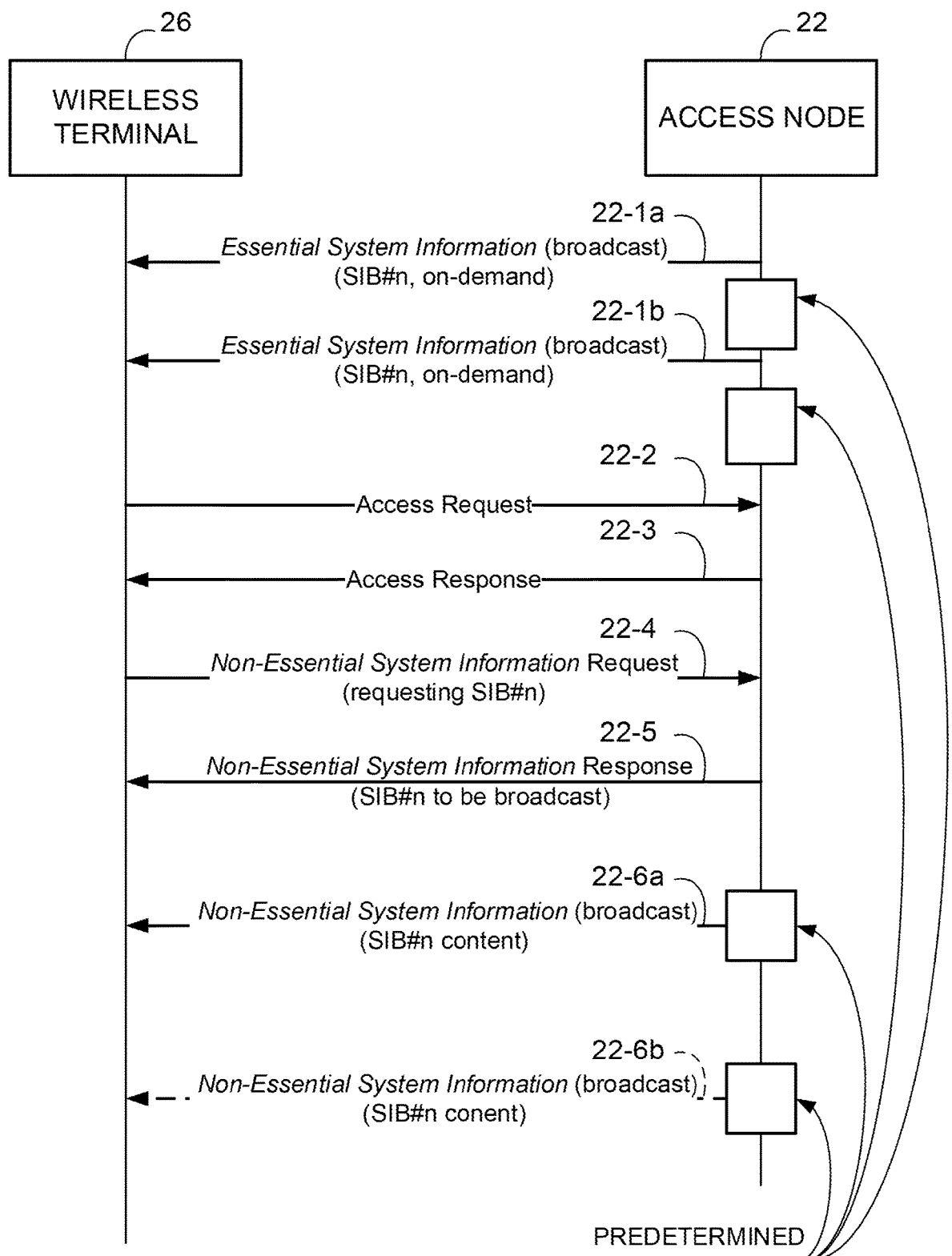
FIG. 22-FIG. 25 are diagrammatic views illustrating example message flows according to example implementations of the present application.

FIG. 22-FIG. 25 are diagrammatic views illustrating example message flows according to example implementations of the present application. In FIG. 22, the initial messages (e.g., the Essential System Information messages 22-1a and 22-1b, the Access Request message 22-2, and the Access Response 22-3) of FIG. 22 are similar to those of some preceding implementations and modes, but in FIG. 22 the broadcasts of SIB #n in the Non-Essential System Information message(s) (e.g., the Non-Essential System Information message 22-6a and 22-6b) may occur on predetermined resource allocations. For example, the predetermined resource allocations may be defined by using a periodicity and/or an offset. The access node 22 may optionally repeat sending Non-Essential System Information messages at multiple occasions (e.g., the Non-Essential System Information message 22-6a and 22-6b). The wireless terminal 26 that has sent a Non-Essential System Information Request message 22-4, requesting the SIB #n, may receive Non-Essential System Information on at least one predetermined radio resource allocation, without receiving an Essential System Information message. The wireless terminal 26 may also receive the Non-Essential Information Response 22-5 from the access node 22. The access node 22 may use these allocated resources for other purposes if it does not transmit SIB #n.

In the implementation and mode of FIG. 22, any other wireless terminal entering the coverage first receives the Essential System Information message (e.g., the Essential System Information message 22-1a and 22-1b), then it may monitor predetermined resources for several times before sending Non-Essential System Information Request message 22-4, in order to suppress unnecessary transmissions of Non-Essential System Information Request message. The number of monitoring trials may be predetermined, or may be configured by the Essential System Information message.

In addition, in the implementation and mode of FIG. 22, the predetermined resource allocations can be configurable by including the information of allocations in Essential System Information message(s) (e.g., the Essential System Information message 22-1a and 22-1b). The predetermined resource allocations of a given non-essential SIB may be jointly coded with whether the non-essential SIB is available at this access node by request. Alternatively, the predetermined resource allocations may be tied to the SIB indices.

Figure 23:
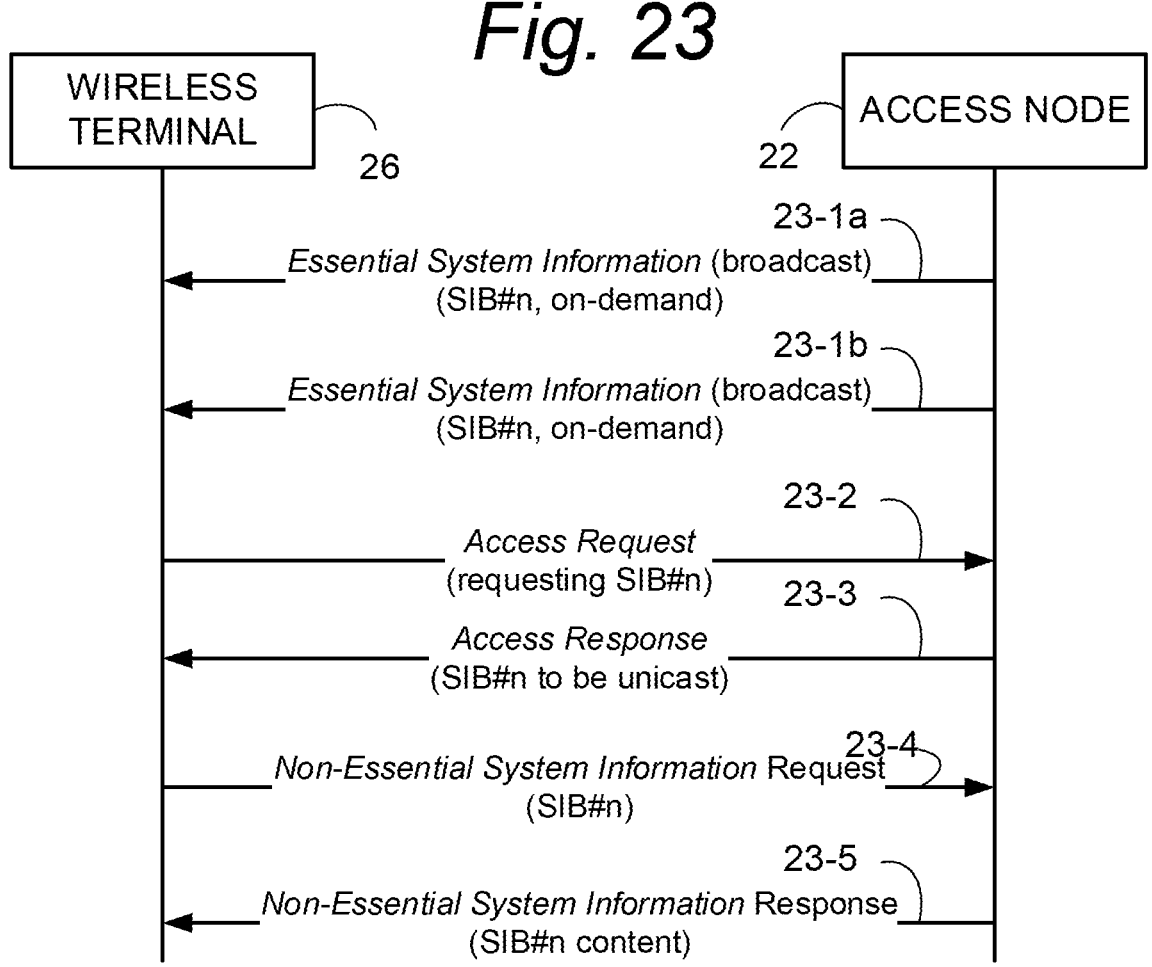
Figure 24:
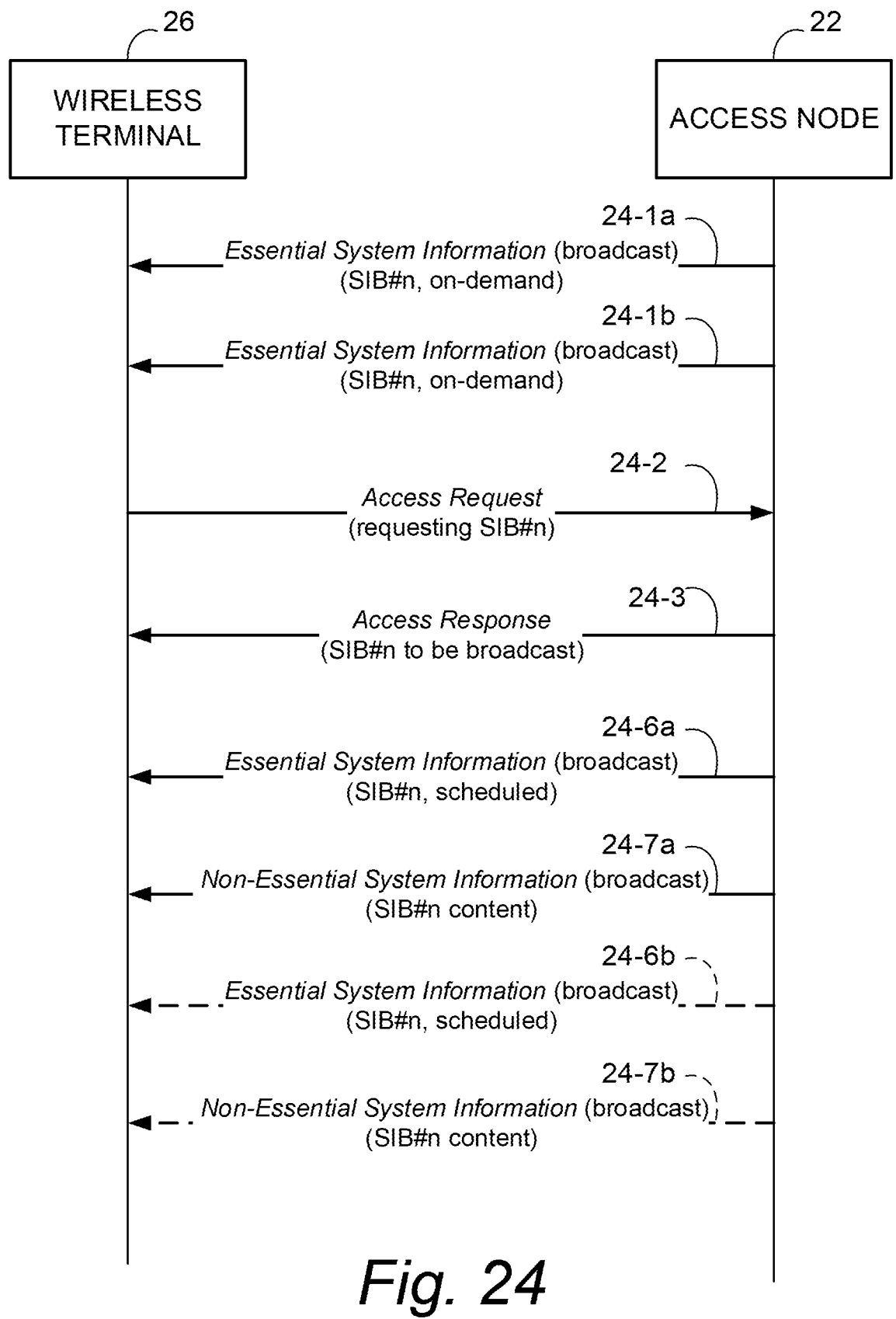
Figure 25:
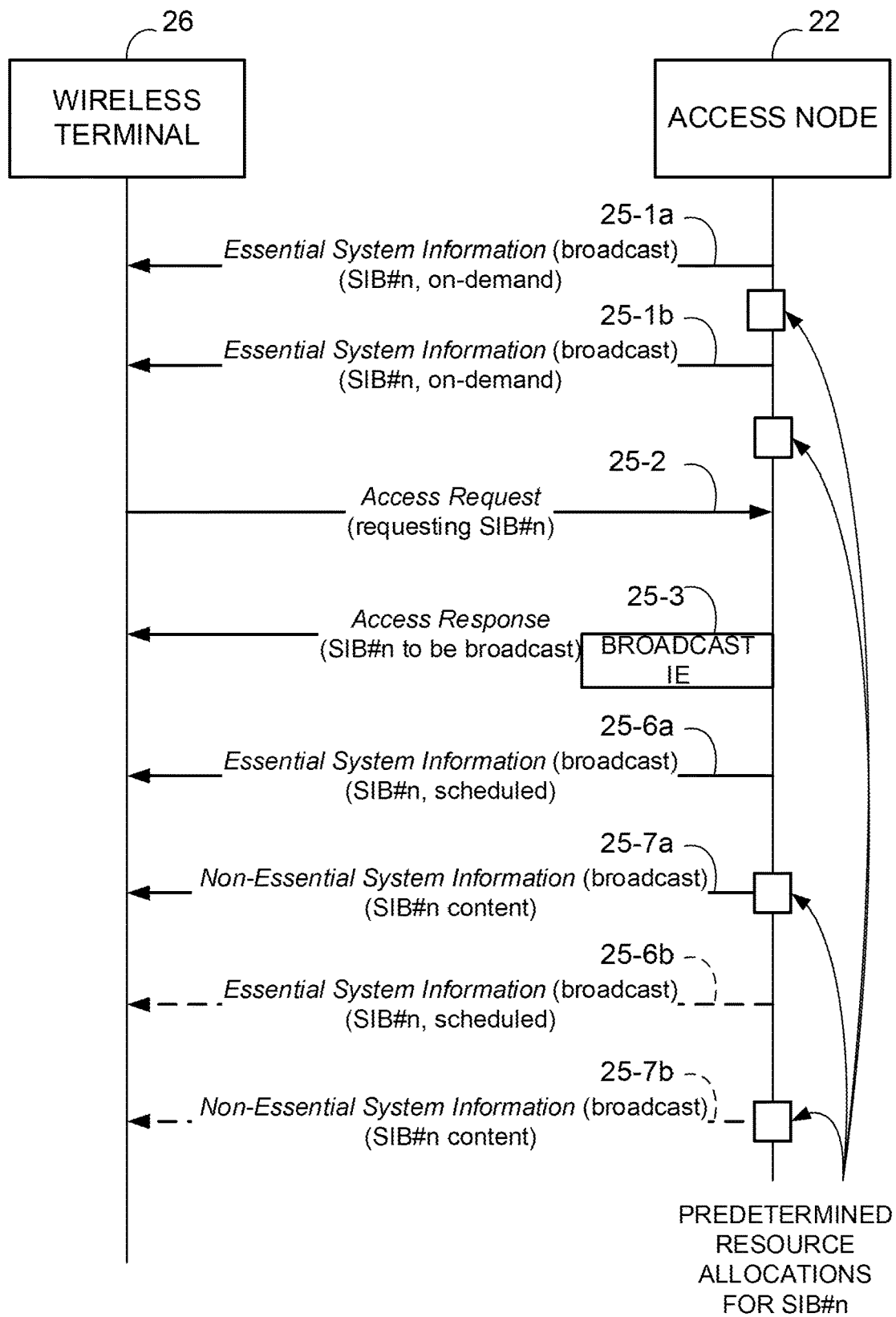

In FIG. 23, the wireless terminal 26 may receive the Essential System Information message(s) (e.g., the Essential System Information messages 23-1a and 23-1b) from the access node 22. The Access Request message(s) 23-2 may contain a request for the SIB #n broadcast. The access node that receives the request may decide to deliver the SIB #n by unicast, or by broadcast. In case of unicast, it may include an information element of unicast indication for SIB #n in the Access Response message 23-3, as shown in FIG. 23. Additionally, the wireless terminal 26 may transmit a Non-Essential System Information Request message 23-4 to the access node 22 and receive a Non-Essential System Information Response 23-5 from the access node 22. In another example, the access node 22 may include an information element of a broadcast indication for SIB #n in Access Response message 24-3, as shown in FIG. 24. Additionally, in FIG. 24, the wireless terminal 26 may receive the Essential System Information message(s) (e.g., the Essential System Information messages 24-1a and 24-1b) from the access node 22 and transmit an Access Request message 24-2 to the access node 22. The wireless terminal 26 may receive an Access Response message 24-3 from the access node 22. The wireless terminal 26 may further receive Essential System Information message(s) (e.g., the Essential System Information messages 24-6a and 24-6b) and Non-Essential System Information message(s) (e.g., the Non-Essential System Information messages 24-7a and 24-7b) from the access node 22. An alternative approach to FIG. 24 is shown in FIG. 25, where Non-Essential System Information message(s) (e.g., the Non-Essential System Information messages 25-7a and 25-7b) is broadcasted on predetermined resource allocations. Additionally, in FIG. 25, the wireless terminal 26 may receive the Essential System Information message(s) (e.g., the Essential System Information messages 25-1a and 25-1b) from the access node 22 and transmit an Access Request message 25-2 to the access node 22. The wireless terminal 26 may receive an Access Response message 25-3 from the access node 22. The wireless terminal 26 may further receive Essential System Information message (s) (e.g., the Essential System Information messages 25-6a and 25-6b) and Non-Essential System Information message (s) (e.g., the Non-Essential System Information messages 25-7a and 25-7b) from the access node 22.

Further information regarding the technology disclosed herein, including but not limited to the example implementations and modes of FIG. 20-FIG. 25, is provided in related U.S. Provisional Application 62/367,447, entitled "ON-DEMAND SYSTEM INFORMATION FOR WIRELESS TELECOMMUNICATIONS," filed on Jul. 27, 2016.

In specific example implementations and modes described above, if the access node 22 updates the content of a non-essential SIB, a new value of the value tag for the SIB may be used, e.g., in the Essential System Information message. In one example implementation, the value tag may be incremented (e.g., incremented by one). The wireless terminals under the coverage of the access node 22 may (1) eventually receive the message with the new value tag, (2) find out that the previously received SIB becomes obsolete, and (3) decide to send a Non-Essential System Information Request message to the access node 22.

Figure 26:
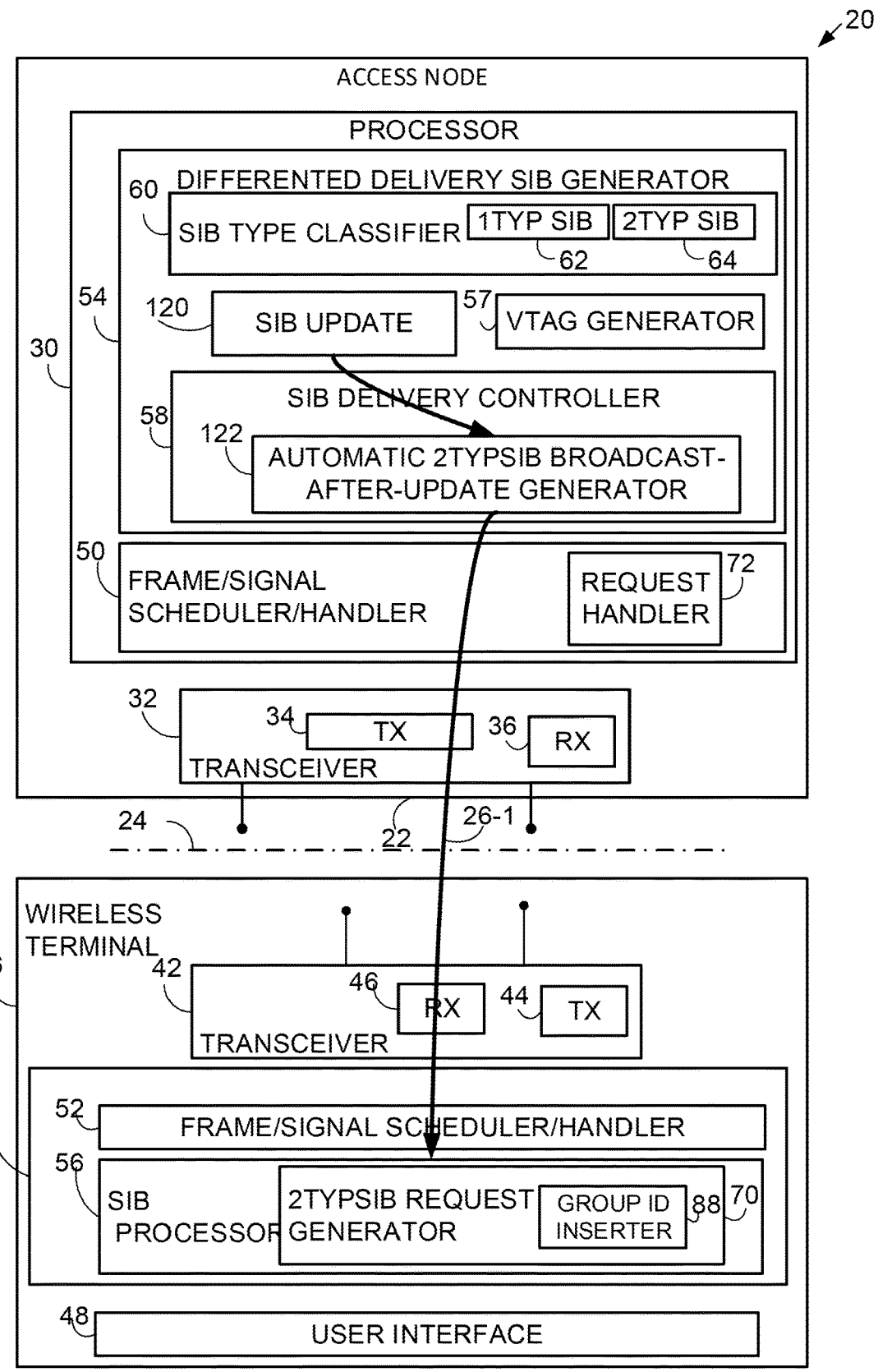
FIG. 26 is a schematic view illustrating an example communications system comprising an access node and a wireless terminal where the access node provides an automatic broadcast-after-update for SI according to an example implementation of the present application.

FIG. 26 is a schematic view illustrating an example communications system comprising an access node and a wireless terminal where the access node provides an automatic broadcast-after-update for SI according to an example implementation of the present application. The example implementations and modes in FIG. 26 seek to avoid congestion that may occur if many Non-Essential System Information Request messages are transmitted from wireless terminals. Specifically, the example implementation and mode of FIG. 26 may allow the access node 22 to broadcast the new content of the Non-Essential SIB for limited times after the SIB update. The broadcast-after-update technology of FIG. 26 may be utilized in conjunction/combination with any other of the example implementations and modes described herein.

FIG. 26 illustrates the node processor 30, and SIB generator 54, specifically, as comprising SIB update functionality 120. The SIB update functionality 120 may either update/change the second type SI or detect an update or change in the second type SI. The SIB delivery controller 58 may comprise automatic second type SI broadcast-after-update generator 122. Whenever there is an update or other change for the second type SI as performed or detected by the SIB update functionality 120, the automatic second type SI broadcast-after-update generator 122 may generate broadcast messages 26-1 including the new/updated content of the second type SI. The broadcast messages 26-1 including the new content of the second type SI may continue only for a limited time, or a predetermined number of automatic-after-update broadcast messages.

Figure 27:
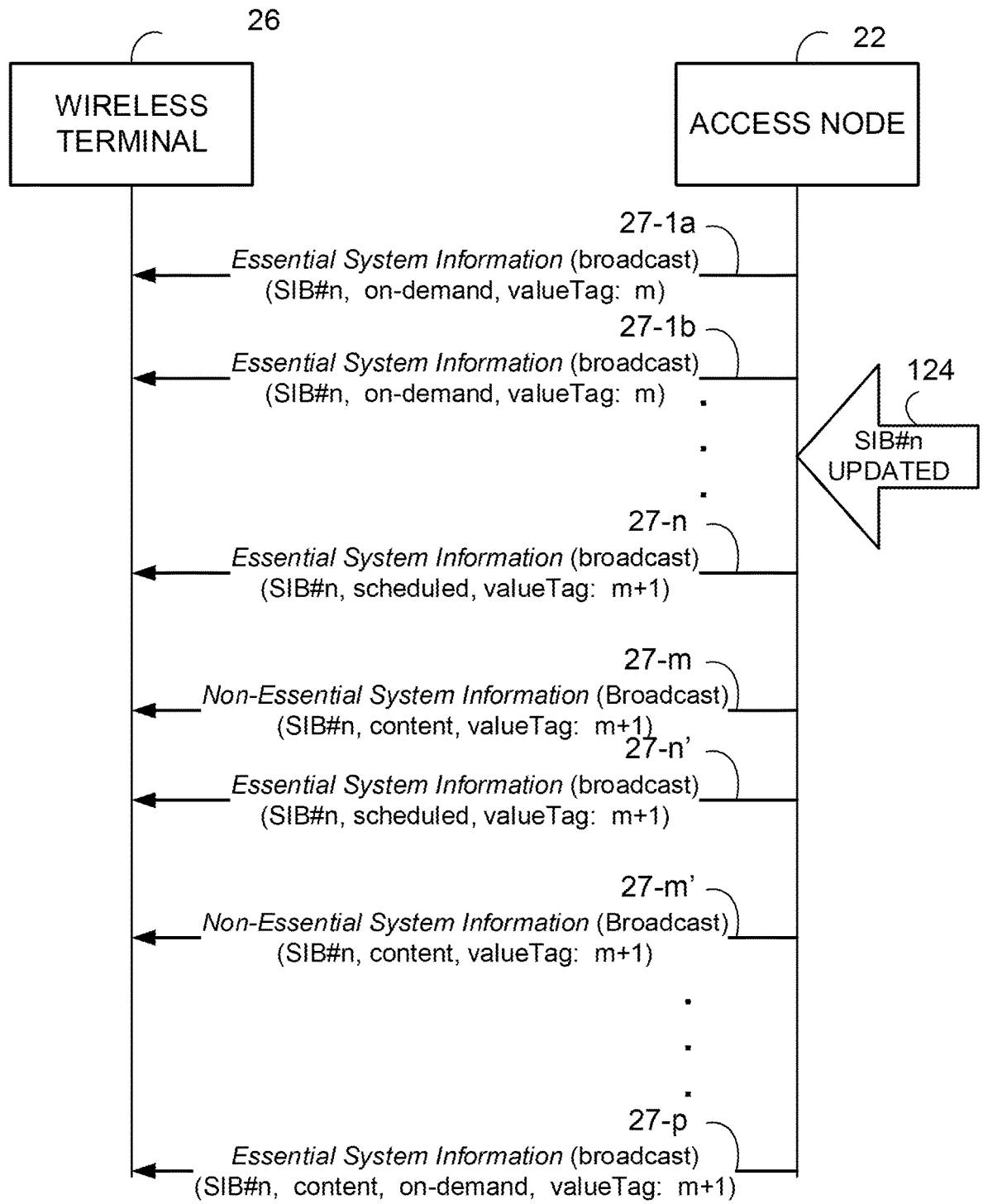
FIG. 27 is a diagrammatic view illustrating an example message flow for the communications system of FIG. 26.

FIG. 27 is a diagrammatic view illustrating an example message flow for the example communications system of FIG. 26. In the example scenario of FIG. 27, as shown by arrow 124 SIB #n gets updated (e.g., by SIB update functionality 120) and its value tag changes from m to m+1. From this moment the access node 22 may start including the new value tag m+1 for SIB #n in the Essential System Information message(s) 27-n. In addition, at least one transmission of the Essential System Information message(s) 27-n after the SIB #n update may include scheduling information to indicate one or a plurality of broadcast schedules for the updated SIB #n content. Based on the scheduling information, the access node 22 may broadcast Non-Essential System Information message(s) 27-m including the updated SIB #n content. As indicated by the primed message suffixes in FIG. 27, the access node 22 may optionally transmit Essential System Information message(s) with the scheduling information and the Non-Essential System Information message(s) with the SIB #n content multiple times, e.g., for a predetermined time period after the SIB #n update, for example. As further shown in FIG. 27, after the automatic broadcast-after-update messages 27-n and 27-m, the access node 22 may also broadcast the fact that the SIB #n update is available on demand, as indicated by message 27-*p*.

In the example implementation and mode of FIG. 26 and FIG. 27, the access node 22 may use the message format shown in FIG. 21 for the Essential System Information message with the scheduling information. The wireless terminals receiving this Essential System Information message may attempt to receive the scheduled Non-Essential System Information message, instead of requesting on-demand delivery of the updated SIB #n. Once the scheduled broadcasts of the updated SIB #n content are completed, the wireless terminal may no longer use the optional information element.

Some communication systems may employ discontinuous reception (DRX), where the wireless terminals do not always monitor the periodic transmission of the Essential System Information message. In order to ensure that the wireless terminals under the coverage of the access node receive the automatic broadcast-after-update messages, the system in some implementations may use a separate signaling mechanism to trigger the reception of the Essential System Information message. One example is that the access node may include an indication in the Paging message for predetermined duration before transmitting the Essential System Information message 27-*n*.

Figure 28:
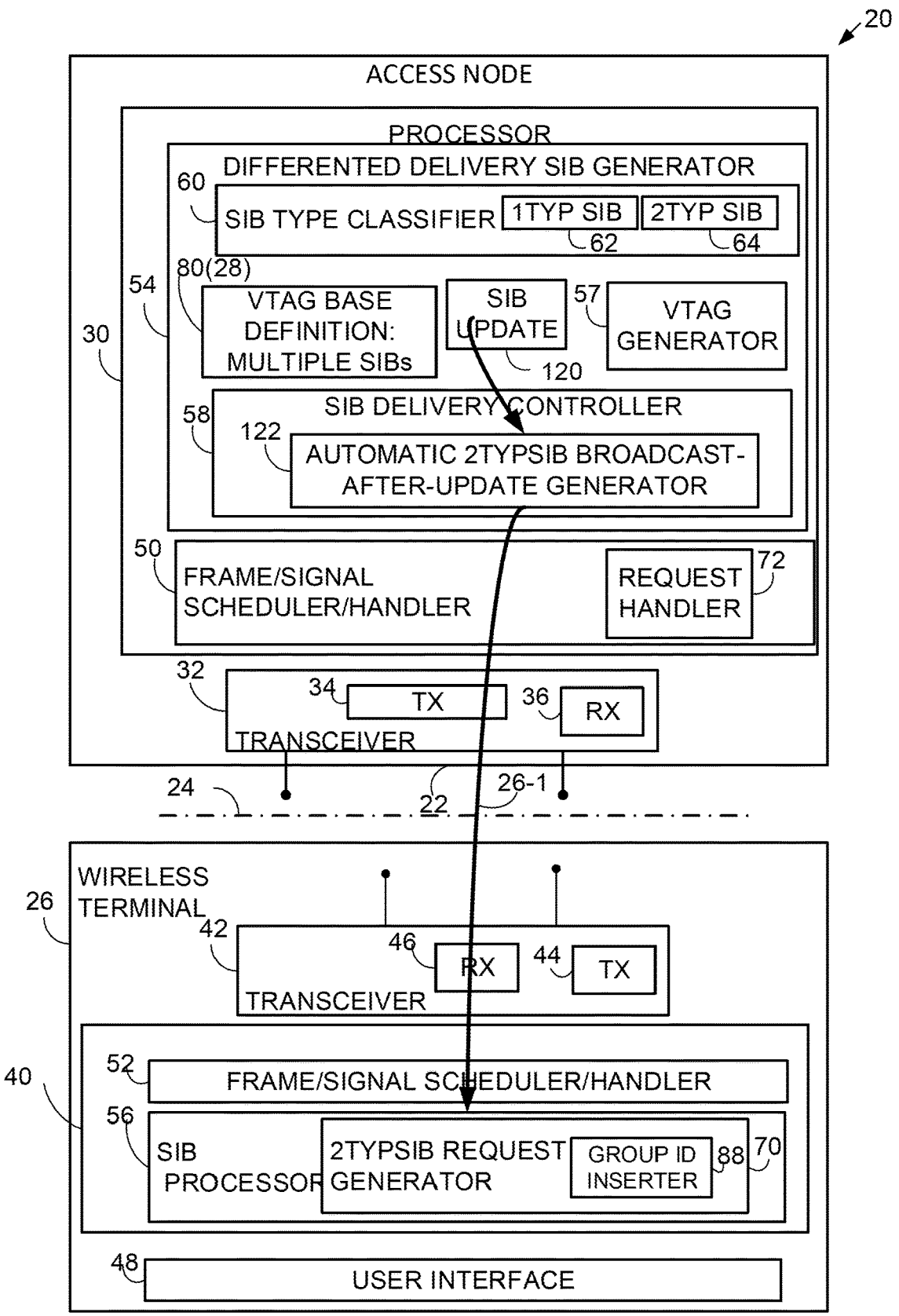
FIG. 28 is a schematic view illustrating an example communications system comprising an access node and a wireless terminal where the access node provides an automatic broadcast-after-update for SI for a group of second type SIBs according to an example implementation of the present application.

FIG. 28 is a schematic view illustrating an example communications system comprising an access node 22 and a wireless terminal 26 where the access node 22 provides an automatic broadcast-after-update for SI for a group of second type SIBs according to an example implementation of the present application. The example implementation and mode of FIG. 28 may be based at least in part on the example implementation and mode of FIG. 26 and at least in part on the example implementation and mode of FIG. 14, where the access node 22 may employ the concept of non-essential SIB groups. In the example implementation and mode of FIG. 28, the Non-Essential System Information message which is automatically broadcasted after the SIB content update may include the contents of multiple SIBs grouped with the same value tag.

FIG. 28 illustrates the node processor 30 and the SIB generator 54, specifically, as comprising not only the SIB update functionality 120 and the automatic second type SI broadcast-after-update generator 122, but also a value tag base definition logic 80(28) which defines multiple SIB groups associated with the value tag.

Figure 29:
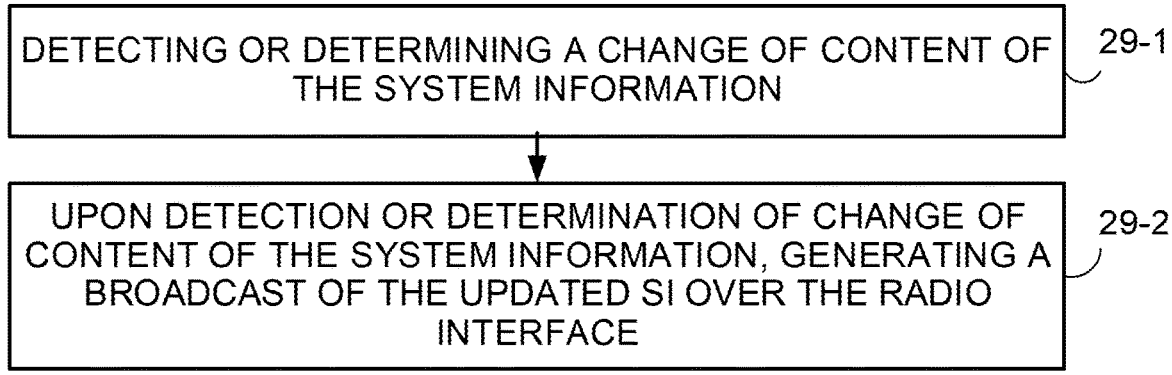
FIG. 29 is a flowchart illustrating basic acts or steps performed by the access node of FIG. 28.

FIG. 29 is a flowchart illustrating an example, representative, basic acts or steps performed by the access node of FIG. 28. Act 29-1 comprises detecting or determining a change of content of the SI. Act 29-2 comprises, upon the detection or the determination of change of content of the SI, generating a broadcast of the updated SI over the radio interface. In the example implementation and mode of FIG. 29, the change of content may be an update of the SI, and the changed or updated SI may, specifically, be second type SI. Moreover, the broadcast may be broadcast messages which are scheduled, with scheduling information for such broadcast being included in previous broadcast such as a NASI message. Such previous broadcast message may be, in at least some implementations, an Essential System Information broadcast message. Moreover, in example implementation, the broadcast of the second type SI over the radio interface may occur only for a predetermined time, e.g., a predetermined number of such broadcasts.

Figure 30:
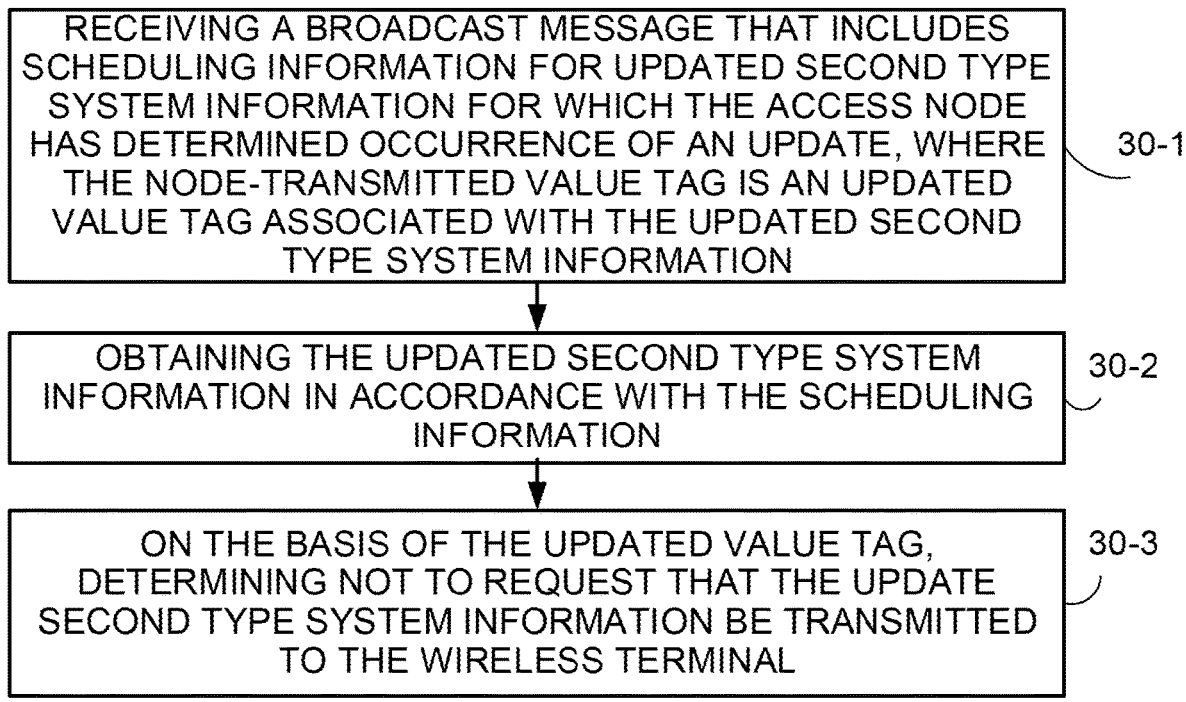
FIG. 30 is a flowchart illustrating basic acts or steps performed by the wireless terminal of FIG. 28.

FIG. 30 is a flowchart illustrating basic acts or steps performed by the wireless terminal of FIG. 28. Act 30-1 comprises receiving a broadcast message that includes scheduling information for updated second type SI for which the access node has determined occurrence of an update, where the node-transmitted value tag is an updated value tag associated with the updated second type SI. Act 30-2 comprises obtaining the updated second type SI in accordance with the scheduling information. Act 30-3 comprises, on the basis of the updated value tag, determining not to request that the update second type SI be transmitted to the wireless terminal.

Figure 31:
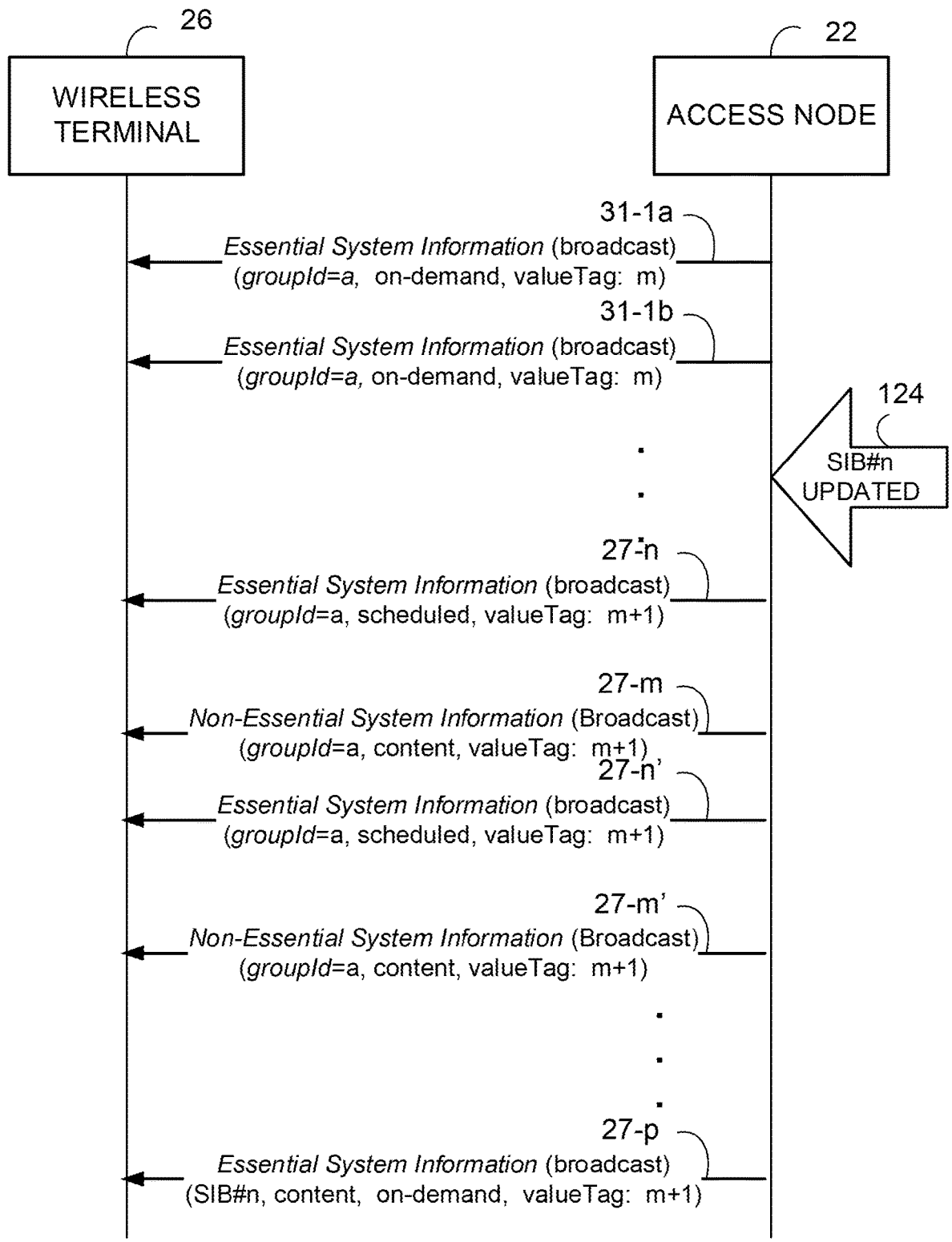
FIG. 31 is a diagrammatic view illustrating an example message flow for the communications system of FIG. 28.
Figure 32:
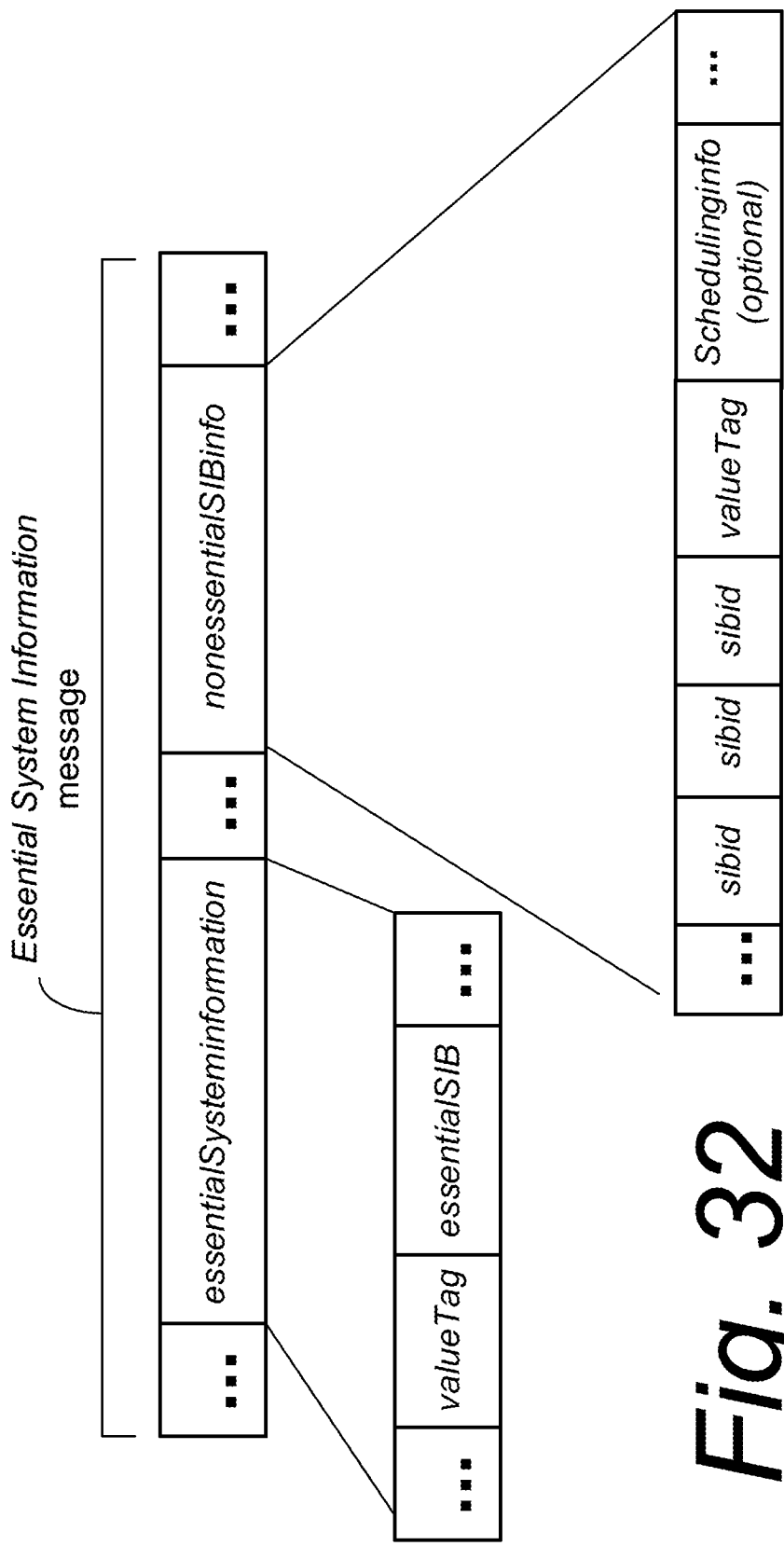
FIG. 32 is a diagrammatic view illustrating an example format of an Essential System Information message according to the system of FIG. 28.

FIG. 31 is a diagrammatic view illustrating an example message flow for the example communications system of FIG. 28. FIG. 32 is a diagrammatic view illustrating an example format of an Essential System Information message according to the system of FIG. 28.

Figure 33:
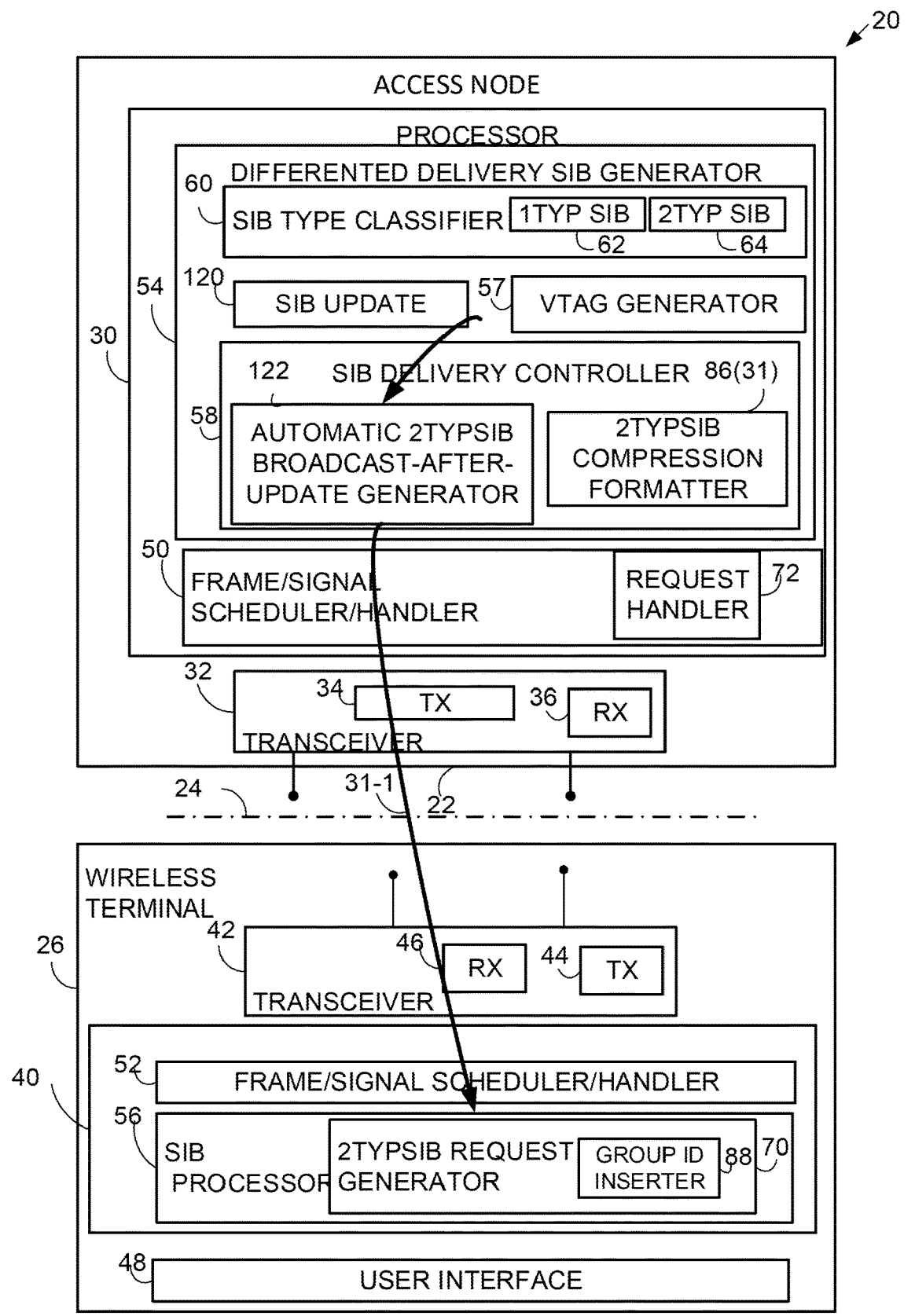
FIG. 33 is a schematic view illustrating an example communications system comprising an access node and a wireless terminal where the access node provides a compressed automatic broadcast-after-update message for second type SIBs according to an example implementation of the present application.

FIG. 33 is a schematic view illustrating an example communications system comprising an access node and a wireless terminal where the access node provides a compressed automatic broadcast-after-update message for second type SIBs according to an example implementation of the present application. The example implementations and modes in FIG. 33 may allow the access node 22 to broadcast a "compressed" image of updated Non-Essential System Information in conjunction with the automatic broadcast-after-update feature. The node processor 30 of access node 22, and the SIB generator 54, specifically, may comprise both the SIB update functionality 120 and automatic second type SI broadcast-after-update generator 122, as well as 2 TYPSIB compression formatter 86(31). Upon actual update or detection of update of SI by functionality 120, the broadcast-after-update generator 122 may generate a compressed SIB broadcast-after-update message 33-1, in which compression is achieved by virtue of 2 TYPSIB compression formatter 86(31) preferably including in the SIB broadcast-after-update message 33-1 only those SI parameters of the SIB block which have changed.

Figure 34:
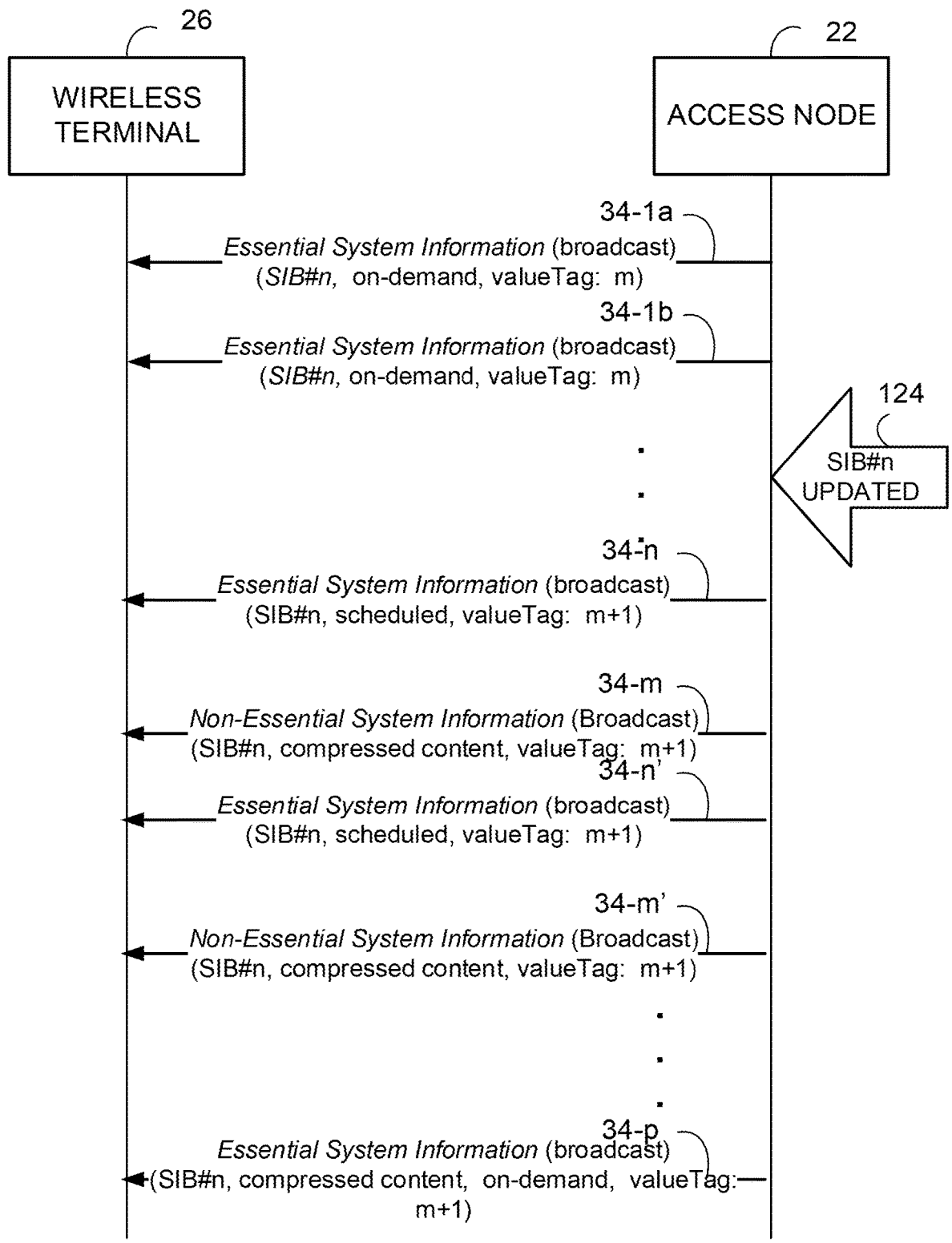
FIG. 34 is a diagrammatic view illustrating an example message flow for the communications system of FIG. 33.

FIG. 34 is a diagrammatic view illustrating an example message flow for the communications system of FIG. 33. In FIG. 32, the broadcasted Non-Essential System Information message(s) 34-*n* may include(s) a compressed content of the updated SIB #n with valueTag=m+1. As described in a previous implementation and mode, in one implementation the compressed content may comprise the differences between the updated SIB #n (valueTag=m+1) and the previously transmitted (valueTag=m).

The wireless terminal 26 which receives the broadcasted Non-Essential System Information message 34-*n* with the compressed SIB #n content with valueTag=m+1 checks if it has previously received SIB #n with valueTag=m and has saved the content in its memory. If so, the wireless terminal 26 may simply apply the received compressed image to the saved content to construct the updated content. Otherwise, the wireless terminal 26 may initiate an on-demand delivery request of the updated SIB #n content using one or some of the methods already disclosed above.

Figure 35:
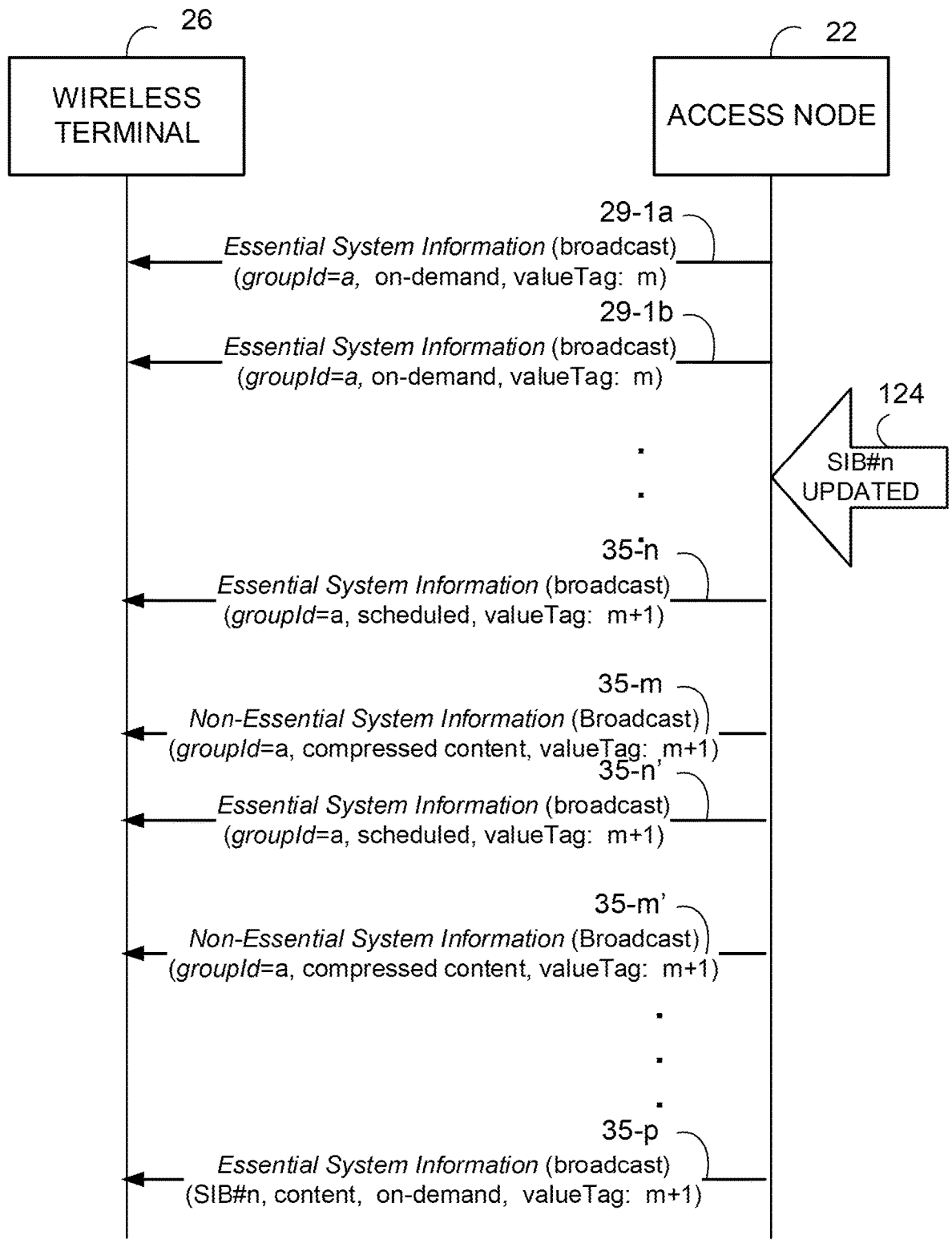
FIG. 35 is a diagrammatic view illustrating an example message flow for the communications system of FIG. 33 which also uses compression.

FIG. 35 is a diagrammatic view illustrating an example message flow for the communications system of FIG. 33 which also uses compression. The specific example implementations and modes in FIG. 35 may apply the concept of non-essential SIB groups to the example compression implementation and mode of FIG. 32 in conjunction with the automatic broadcast-after-update feature. In FIG. 35 the Essential System Information message 35-*n* may advertise one or more groupIds, each of which is associated with a value tag valueTag, as disclosed in a previous example implementation and mode. Similar to a previous example implementation and mode, the broadcasted Non-Essential System Information message 35-*m* may contain compressed content of the non-essential SIB group. In one implementation, the compressed content may comprise the differences between the current non-essential SIBs (valueTag=m+1) and the previously broadcasted (valueTag=m) under the same non-essential SIB group.

Figure 36:
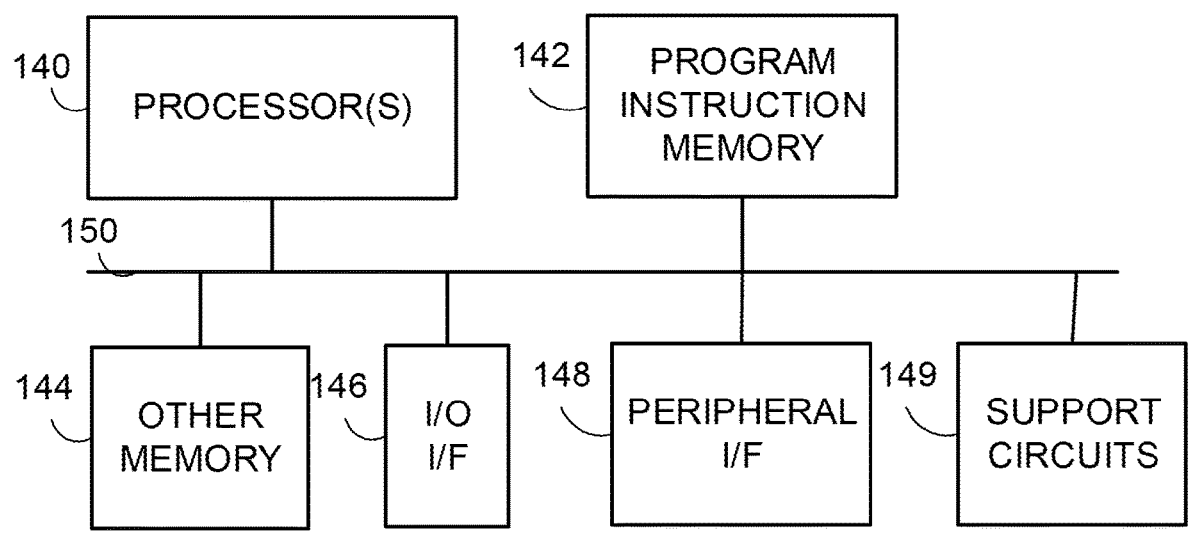
FIG. 36 is a diagrammatic view illustrating an example electronic machinery that may comprise node electronic machinery or terminal electronic machinery according to an example implementation of the present application.

FIG. 36 is a diagrammatic view illustrating an example electronic machinery that may comprise node electronic machinery or terminal electronic machinery according to an example implementation of the present application. Specific units and functionalities of node 22 and wireless terminal 26 are, in example implementations, implemented by electronic machinery, computer, and/or circuitry. For example, the node processors 30 and terminal processors 40 of the example implementations herein described and/or encompassed may be comprised by the computer circuitry of FIG. 36. FIG. 36 illustrates an example of such electronic machinery or circuitry, whether node or terminal, as comprising one or more processor(s) circuits 140, program instruction memory 142; other memory 144 (e.g., random access memory (RAM), cache, etc.); input/output interfaces 146; peripheral interfaces 148; support circuits 149; and busses 150 for communication between the aforementioned units.

The program instruction memory 142 may comprise coded instructions which, when executed by the processor (s), perform acts including but not limited to those described herein. Thus, it is understood that each of node processor 30 and terminal processor 40, for example, comprise memory in which non-transient instructions are stored for execution.

The memory 144, or computer-readable medium, may be one or more of readily available memory such as RAM, read only memory (ROM), floppy disk, hard disk, flash memory or any other form of digital storage, local or remote, and is preferable of non-volatile nature. The support circuits 149 are coupled to the processors 140 for supporting the processor in a conventional manner. These circuits include cache, power supplies, clock circuits, input/output circuitry and subsystems, and the like.

The technology of this disclosure thus encompasses but is not limited to the following example implementations, example features, and example advantages:

Example Implementation 1: A user equipment (UE) for receiving system information, comprising:
 a processor; and
 memory in electronic communication with the processor, where instructions stored in the memory are executable to:
 receive first system information (SI) periodically broadcasted from eNB;
 determine types of second SI to additionally receive, where each of said types corresponds to a second SIB;
 transmit to the eNB a request containing said types of the second SI;
 receive the requested second SI from the eNB.

Example Implementation 2: The UE of Example Implementation 1, where contents of one or a plurality of second SIBs are associated with a value tag.

Example Implementation 3: The UE of Example Implementation 2, where from said first SI the UE obtains value tags, each of which indicates the current version of the corresponding second SIBs.

Example Implementation 4: The UE of Example Implementation 3, where the UE retrieves broadcast scheduling information of said second SI from said first SI.

Example Implementation 5: The UE of Example Implementation 4, where the UE receives the broadcasted second SI based on said scheduling information.

Example Implementation 6: The UE of Example Implementation 4, where the UE refrains from requesting delivery of second SIBs if the first SI indicates broadcast delivery of said second SI.

Example Implementation 7: The UE of Example Implementation 6, where the UE refrains from requesting delivery of second SIBs if the first SI indicates broadcast delivery of said second SI and if the current value tag for these second SIBs is different from the saved value tag for the same second SIBs.

Example Implementation 8: The UE of Example Implementation 4, where the second SIBs associated with a same value tag is identified by a group index.

Example Implementation 9: The UE of Example Implementation 5, where the UE receives one or a plurality of compressed contents based on said scheduling information, each of which is a compressed image of one or a plurality of second SIBs.

Example Implementation 10: An evolved node B (eNB) for delivering SI, comprising:
 a processor; and
 memory in electronic communication with the processor, where instructions stored in the memory are executable to:
 periodically broadcast first SI that includes types of second SI available by request, where each of said types corresponds to a second SIB;
 receive from a UE a request for transmission of said second SI;
 transmit said requested second SI.

Example Implementation 11: The eNB of Example Implementation 10, where contents of one or a plurality of second SIBs are associated with a value tag.

Example Implementation 12: The eNB of Example Implementation 11, where the eNB includes in said first SI value tags, each of which indicates the current version of the corresponding second SIBs.

Example Implementation 13: The eNB of Example Implementation 12, where the eNB includes broadcast scheduling information of said second SI in said first SI.

Example Implementation 14: The eNB of Example Implementation 12, where the eNB broadcasts said second SI based on said scheduling information.

Example Implementation 15: The eNB of Example Implementation 12, where the eNB includes broadcast scheduling information of said second SI in said first SI after the content of said second SI gets updated.

Example Implementation 16: The eNB of Example Implementation 15, where the inclusion of said broadcast scheduling information in the first SI is limited for predetermined times after the content of said second SI gets updated.

Example Implementation 17: The eNB of Example Implementation 10, where the second SIBs associated with a same value tag is identified by a group index, Example Implementation 18: The eNB of Example Implementation 11, where the eNB transmits one or a plurality of compressed contents based on said scheduling information, each of which is a compressed image of one or a plurality of second SIBs.

Example Implementation 19: An access node of a radio access network comprising:
 processor circuitry configured:
 upon a change of content of SI, to include, in a broadcast message comprising first SI which is broadcast from the access node, an indication of when the access node is scheduled to broadcast second SI which is not included in the first SI;

a transmitter configured to transmit, over a radio interface, the broadcast message comprising the first SI and thereafter the broadcast of the second SI according to the indication.

Example Implementation 20: The access node of Example Implementation 19, where the processor circuitry is further configured, upon the change of content of the SI, to generate multiple broadcasts of the second SI over the radio interface for a predetermined time.

Example Implementation 21: The access node of Example Implementation 19, where the processor circuitry is further configured, upon the change of content of the SI, to generate the broadcast of the second SI in a compressed format reflecting portions of the second SI that have changed content.

Example Implementation 22: The access node of Example Implementation 19, where the processor circuitry is further configured, upon the change of content of the SI, to generate the broadcast of the second SI, the broadcast of the second SI comprising an association of a group of SIBS with a same value tag.

Example Implementation 23: The access node of Example Implementation 19, where the processor circuitry is further configured the broadcast of the second SI to comprise a value tag.

Example Implementation 24: The access node of Example Implementation 19, where the first type SI is periodically broadcasted by the transmitter and is required for initial access to the radio access network, and where the second type SI is not required for initial access to the radio access network.

Example Implementation 25: A method in an access node of a radio access network comprising:

upon a change of content of SI, using processor circuitry to include, in a broadcast message comprising first SI which is broadcast from the access node, an indication of when the access node is scheduled to broadcast second SI which is not included in the first SI;

transmitting, over a radio interface, the broadcast message comprising the first SI and thereafter the broadcast of the second SI according to the indication.

Example Implementation 26: The method of Example Implementation 25, further comprising, upon the change of content of the SI, generating multiple broadcasts of the updated SI over the radio interface for a predetermined time.

Example Implementation 27: The method of Example Implementation 25, further comprising, upon the change of content of the SI, generating the broadcast of the updated SI in a compressed format reflecting portions of the second SI that comprise changed content.

Example Implementation 28: The method of Example Implementation 25, further comprising, upon the change of content of the SI, generating the broadcast of the updated SI, the NASI comprising an association of a group of SIBs with a same value tag.

Example Implementation 29: The method of Example Implementation 25 further comprising the processor circuitry including a value tag in the broadcast of the second SI.

Example Implementation 30: The method of Example Implementation 25 where the first type SI is periodically broadcasted by the transmitter and is required for initial access to the radio access network, and where the second type SI is not required for initial access to the radio access network.

Example Implementation 31: A wireless terminal which communicates over a radio interface with an access node of a radio access network comprising:

a receiver configured to receive messages from the access node including a first broadcast message and a second broadcast message;

processor circuitry configured to:

determine, from the first broadcast message, scheduling information concerning the second broadcast message;

obtain SI from the second broadcast message based on the scheduling information.

Example Implementation 32: The wireless terminal of Example Implementation 31, where the processor circuitry is further configured to:

obtain from the first broadcast message a value tag; and determine not to request SI from the access node based on the value tag.

Example Implementation 33: The wireless terminal of Example Implementation 31, where:

the first broadcast message comprises first SI and the scheduling information, and the second broadcast message comprises second SI that is not included in the first SI.

Example Implementation 34: The wireless terminal of Example Implementation 33, where the first type SI is periodically broadcasted by the transmitter and is required for initial access to the radio access network, where the second type SI is not required for initial access to the radio access network.

Example Implementation 35: The wireless terminal of Example Implementation 31, where the receiver is further configured to attempt to receive the multiple second broadcast messages over the radio interface for a predetermined time.

Example Implementation 36: The wireless terminal of Example Implementation 31, where the processor circuitry is further configured to obtain updated SI included in the second broadcast message in a compressed format reflecting portions of the SI that have changed content.

Example Implementation 37: The wireless terminal of Example Implementation 31, where the processor circuitry is further configured to obtain updated SI included in the second broadcast message as a group of SIBs having an associated updated value tag.

Example Implementation 38: A method in a wireless terminal which communicates over a radio interface with an access node of a radio access network the method comprising:

receiving messages from the access node including a first broadcast message and a second broadcast message;

using processor circuitry to:

determine, from the first broadcast message, scheduling information concerning the second broadcast message;

obtain SI from the second broadcast message based on the scheduling information.

Example Implementation 39: The method of Example Implementation 38, where the processor circuitry is further configured to:

obtain from the first broadcast message a value tag; and determine not to request SI from the access node based on the value tag.

Example Implementation 40: The method of Example Implementation 38, where:

the first broadcast message comprises first SI and the scheduling information, and the second broadcast message comprises second SI that is not included in the first SI.

Example Implementation 41: The method of Example Implementation 40, where the first type SI is periodically broadcasted by the transmitter and is required for initial access to the radio access network, where the second type SI is not required for initial access to the radio access network.

Example Implementation 42: The method of Example Implementation 38, further comprising attempting to receive multiple second broadcast messages over the radio interface for a predetermined time.

Example Implementation 43: The method of Example Implementation 38, further comprising obtaining the second broadcast SI in a compressed format reflecting portions of the SI that have changed content.

Example Implementation 44: The method of Example Implementation 38, further comprising obtaining the second broadcast SI as a group of SIBs having an associated same value tag.

Although the processes and methods of the disclosed implementations may be discussed as being implemented as a software routine, some of the method steps that are disclosed therein may be performed in hardware as well as by a processor running software. As such, the implementations may be implemented in software as executed upon a computer system, in hardware as an application specific integrated circuit or other type of hardware implementation, or a combination of software and hardware. The software routines of the disclosed implementations are capable of being executed on any computer operating systems, and are capable of being performed using any central processing unit(s) (CPU(s)) architecture. The instructions of such software are stored on non-transient computer readable media.

The functions of the various elements including functional blocks, including but not limited to those labeled or described as "computer," "processor" or "controller," may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, the use of the term "processor" or "controller" shall also be construed to refer to other hardware capable of performing such functions and/or executing software, such as the example hardware recited above.

The functions of the various elements including functional blocks, including but not limited to those labeled or described as "computer," "processor" or "controller," may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred implementations of the technology disclosed herein. Thus, the scope of the technology disclosed herein should be determined by the appended claims and their legal equivalents. Therefore, it will be appreciated that the scope of the technology disclosed herein fully encompasses other implementations which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred implementation that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An access node of a radio access network that communicates over a radio interface with a wireless terminal, the access node comprising:
 processor circuitry configured to:
  generate a first type system information block (SIB) comprising information indicating whether one or more associated second type SIBs are provided by broadcast or on-demand, the first type SIB required for the wireless terminal to perform an initial access to the radio access network; and
  upon a change of one second type SIB of the one or more associated second type SIBs whose associated information previously indicated that the one second type SIB was provided on-demand, include in the first type SIB the associated information indicating that the one second type SIB is provided by broadcast;

transmitter circuitry configured to:
- transmit the first type SIB; and
- transmit a message that triggers the wireless terminal to receive the first type SIB.

2. The access node of claim 1, wherein:
the transmitter circuitry is further configured to transmit the one second type SIB by broadcast after the change;
whether the one second type SIB has changed is determined based on a value tag; and
the value tag is associated with the one second type SIB, stored in the wireless terminal, and included in the first type SIB corresponding to the one second type SIB.

3. A method for an access node of a radio access network that communicates over a radio interface with a wireless terminal, the method comprising:
generating a first type system information block (SIB) comprising information indicating whether one or more associated second type SIBs are provided by broadcast or on-demand, the first type SIB required for the wireless terminal to perform an initial access to the radio access network;
upon a change of one second type SIB of the one or more associated second type SIBs whose associated information previously indicated that the one second type SIB was provided on-demand, including in the first type SIB the associated information indicating that the one second type SIB is provided by broadcast;
transmitting the first type SIB; and
transmitting a message that triggers the wireless terminal to receive the first type SIB.

4. The method of claim 3, further comprising transmitting the one second type SIB by broadcast after the change, wherein:
whether the one second type SIB has changed is determined based on a value tag; and
the value tag is associated with the one second type SIB, stored in the wireless terminal, and included in the first type SIB corresponding to the one second type SIB.

5. A wireless terminal of a radio access network that communicates over a radio interface with an access node of the radio access network, the wireless terminal comprising:
receiver circuitry configured to:
- receive a message that triggers reception of a first type system information block (SIB); and
- receive, based on the reception of the message, the first type system information block (SIB) comprising information indicating whether one or more associated second type SIBs are provided by broadcast or on-demand, the first type SIB used to perform an initial access to the radio access network; and processor circuitry configured to determine whether one second type SIB of the one or more associated second type SIBs has changed,
wherein the receiver circuitry is further configured to perform reception of the one second type SIB based on information associated with the one second type SIB in a case that the one second type SIB has changed; and
wherein in a case that the one second type SIB was provided on-demand before the change, the associated information indicates that the one second type SIB is provided by broadcast.

6. The wireless terminal of claim 5, wherein:
whether the one second type SIB has changed is determined based on a value tag; and
the value tag is associated with the one second type SIB, stored in the wireless terminal, and included in the first type SIB corresponding to the one second type SIB.

7. A method for a wireless terminal of a radio access network that communicates over a radio interface with an access node of the radio access network, the method comprising:
receiving a message that triggers reception of a first type system information block (SIB);
receiving, based on the reception of the message, the first type SIB comprising information indicating whether one or more associated second type SIBs are provided by broadcast or on-demand, the first type SIB used to perform an initial access to the radio access network; and
determining whether one second type SIB of the one or more associated second type SIBs has changed,
wherein reception of the one second type SIB is performed based on information associated with the one second type SIB in a case that the one second type SIB has changed; and
wherein in a case that the one second type SIB was provided on-demand before the change, the associated information indicates that the one second type SIB is provided by broadcast.

8. The method of claim 7, wherein:
whether the one second type SIB has changed is determined based on a value tag; and
the value tag is associated with the one second type SIB, stored in the wireless terminal, and included in the first type SIB corresponding to the one second type SIB.

\* \* \* \* \*